United States Patent
Moon et al.

(10) Patent No.: US 11,493,962 B2
(45) Date of Patent: Nov. 8, 2022

(54) ELECTRONIC DEVICE WITH FLEXIBLE DISPLAY AND CAMERA

(71) Applicant: Samsung Electronics Co., Ltd., Suwon-si (KR)

(72) Inventors: Chanyoung Moon, Suwon-si (KR); Hokeun Kwak, Suwon-si (KR); Doosik Park, Suwon-si (KR); Woosung Chun, Suwon-si (KR); Mooyoung Kim, Suwon-si (KR); Kihuk Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 94 days.

(21) Appl. No.: 16/988,911

(22) Filed: Aug. 10, 2020

(65) Prior Publication Data

US 2021/0041917 A1    Feb. 11, 2021

(30) Foreign Application Priority Data

Aug. 8, 2019  (KR) .......................... 10-2019-0096976

(51) Int. Cl.
*G06F 1/16*          (2006.01)
(52) U.S. Cl.
CPC .......... *G06F 1/1652* (2013.01); *G06F 1/1616* (2013.01); *G06F 1/1626* (2013.01); *G06F 1/1686* (2013.01)
(58) Field of Classification Search
CPC .... G06F 1/1652; G06F 1/1616; G06F 1/1626; G06F 1/1686; G06F 1/1641; H04M 1/0264; H04M 1/0216; H04M 1/0268; G09F 9/301
See application file for complete search history.

(56) References Cited

U.S. PATENT DOCUMENTS

| | | | |
|---|---|---|---|
| 7,437,185 B2 | 10/2008 | Yang et al. | |
| 9,736,956 B2 | 8/2017 | Moon et al. | |
| 2003/0001817 A1* | 1/2003 | Jeon | H04M 1/0214 345/156 |

(Continued)

FOREIGN PATENT DOCUMENTS

| CN | 109243306 A | 1/2019 |
|---|---|---|
| KR | 10-0575746 B1 | 5/2006 |

OTHER PUBLICATIONS

International Search Report dated Oct. 29, 2020, issued in International Application No. PCT/KR2020/009444.

*Primary Examiner* — Abhishek M Rathod
(74) *Attorney, Agent, or Firm* — Jefferson IP Law, LLP

(57) ABSTRACT

An electronic device is provided. The electronic device includes as a foldable housing, a first housing structure which includes a first face facing a first direction, a second face facing a second direction opposite to the first direction, and a first side member surrounding at least part of a space between the first face and the second face and including at least one second conductive portion, and a second housing structure which includes a third face facing a third direction, a fourth face facing a fourth direction opposite to the third direction, and a second side member surrounding at least part of a space between the third face and the fourth face, a flexible display extending from the first face to the third face, and at least one camera disposed to the camera mounting region.

19 Claims, 31 Drawing Sheets

(56) References Cited

U.S. PATENT DOCUMENTS

| | | | |
|---|---|---|---|
| 2004/0116166 A1* | 6/2004 | Makishima | H04M 1/0214 |
| | | | 455/575.1 |
| 2004/0183935 A1* | 9/2004 | Shimano | H04M 1/0264 |
| | | | 348/335 |
| 2007/0116447 A1* | 5/2007 | Ye | H04N 5/772 |
| | | | 396/79 |
| 2008/0165439 A1* | 7/2008 | Chang | G02B 7/021 |
| | | | 359/822 |
| 2009/0148149 A1* | 6/2009 | Chishima | H04N 13/239 |
| | | | 396/326 |
| 2010/0253832 A1 | 10/2010 | Duparre | |
| 2014/0267990 A1* | 9/2014 | Moon | G06F 1/1605 |
| | | | 349/122 |
| 2015/0229746 A1* | 8/2015 | Bergin | H04M 1/185 |
| | | | 455/556.1 |
| 2017/0094168 A1 | 3/2017 | Kang et al. | |
| 2017/0353643 A1* | 12/2017 | Tuulos | H04N 5/2257 |
| 2018/0007243 A1* | 1/2018 | Maatta | H04N 5/2252 |
| 2018/0007252 A1* | 1/2018 | Tuulos | G02B 7/003 |
| 2018/0122863 A1 | 5/2018 | Bok | |
| 2018/0255219 A1* | 9/2018 | Ramaprakash | H04N 5/247 |
| 2018/0307270 A1 | 10/2018 | Pantel | |
| 2020/0329178 A1* | 10/2020 | Moon | G06F 1/1686 |

\* cited by examiner

ELECTRONIC DEVICE WITH FLEXIBLE DISPLAY AND CAMERA

CROSS-REFERENCE TO RELATED APPLICATION(S)

This application is based on and claims priority under 35 U.S.C. § 119(a) of a Korean patent application number 10-2019-0096976, filed on Aug. 8, 2019, in the Korean Intellectual Property Office, the disclosure of which is incorporated by reference herein in its entirety.

BACKGROUND

1. Field

The disclosure relates to a camera disposition structure of an electronic device including a flexible display and a camera. More particularly, the disclosure relates to an electronic device having a smaller number of cameras to be mounted, in a foldable electronic device capable of folding or unfolding a flexible display.

2. Description of Related Art

An electronic device may include at least one camera. At least one camera may be disposed to a front face, and at least one camera may be disposed to a rear face.

A mounting structure of the front camera does not allow an interference construction existing within a viewing angle. A mounting structure of the rear camera may also be constructed in a similar shape.

For example, in camera disposition of an in-folding type foldable electronic device, at least one camera may be mounted on one face where a display exists, and at least one camera may be mounted on the other face. In addition, in camera disposition of an out-folding type foldable electronic device, at least one camera may be disposed to each of both edge regions of one face where the display exists, and the camera may not be disposed on the other face.

The above information is presented as background information only to assist with an understanding of the disclosure. No determination has been made, and no assertion is made, as to whether any of the above might be applicable as prior art with regard to the disclosure.

SUMMARY

However, the camera disposition of the in-folding type foldable electronic device requires an excessively large number of cameras to be disposed, which makes the electronic device thick.

In addition, the camera disposition of the out-folding type foldable electronic device may require a smaller number of cameras to be mounted than that of the in-folding type foldable electronic device, but a thickness of the electronic device may still be thick.

Aspects of the disclosure are to address at least the above-mentioned problems and/or disadvantages and to provide at least the advantages described below. Accordingly, an aspect of the disclosure is to provide an electronic device having a smaller number of cameras to be mounted, in a foldable electronic device capable of folding or unfolding a flexible display.

Another aspect of the disclosure is to provide an electronic device capable of reducing obscureness of a viewing angle of a camera in a foldable electronic device capable of folding or unfolding a flexible display.

Additional aspects will be set forth in part in the description which follows and, in part, will be apparent from the description, or may be learned by practice of the presented embodiments.

In accordance with an aspect of the disclosure, an electronic device is provided. The electronic device includes as a foldable housing, a foldable housing including a first housing structure which includes a first face facing a first direction, a second face facing a second direction opposite to the first direction, and a first side member surrounding at least part of a space between the first face and the second face and including at least one second conductive portion, and a second housing structure which includes a third face facing a third direction, a fourth face facing a fourth direction opposite to the third direction, and a second side member surrounding at least part of a space between the third face and the fourth face, and which is folded on the first housing structure, wherein the second face faces the fourth face in a folded state, the third direction is the same as the first direction in an unfolded state, and a portion of an edge of the first housing structure is cut so that a camera mounting region of the second face is visible when viewed from above the third face in the folded state, a flexible display extending from the first face to the third face, and at least one camera disposed to the camera mounting region. In the folded date, at least one edge portion of the second side member adjacent to the camera mounting region may include at least one inclined face constructed by cutting a partial region overlapping with a viewing angle of the at least one camera.

A foldable electronic device according to various embodiments of the disclosure can share a front camera and a rear camera, thereby decreasing an area of mounting cameras, with the decrease in the number of the cameras to be mounted.

An electronic device according to various embodiments of the disclosure can reduce obscureness of a viewing angle of each of a plurality of cameras disposed, in an electronic device capable of folding or unfolding a flexible display.

An electronic device according to various embodiments of the disclosure can reduce a thickness of an electronic device, in a foldable electronic device capable of folding or unfolding a flexible display.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
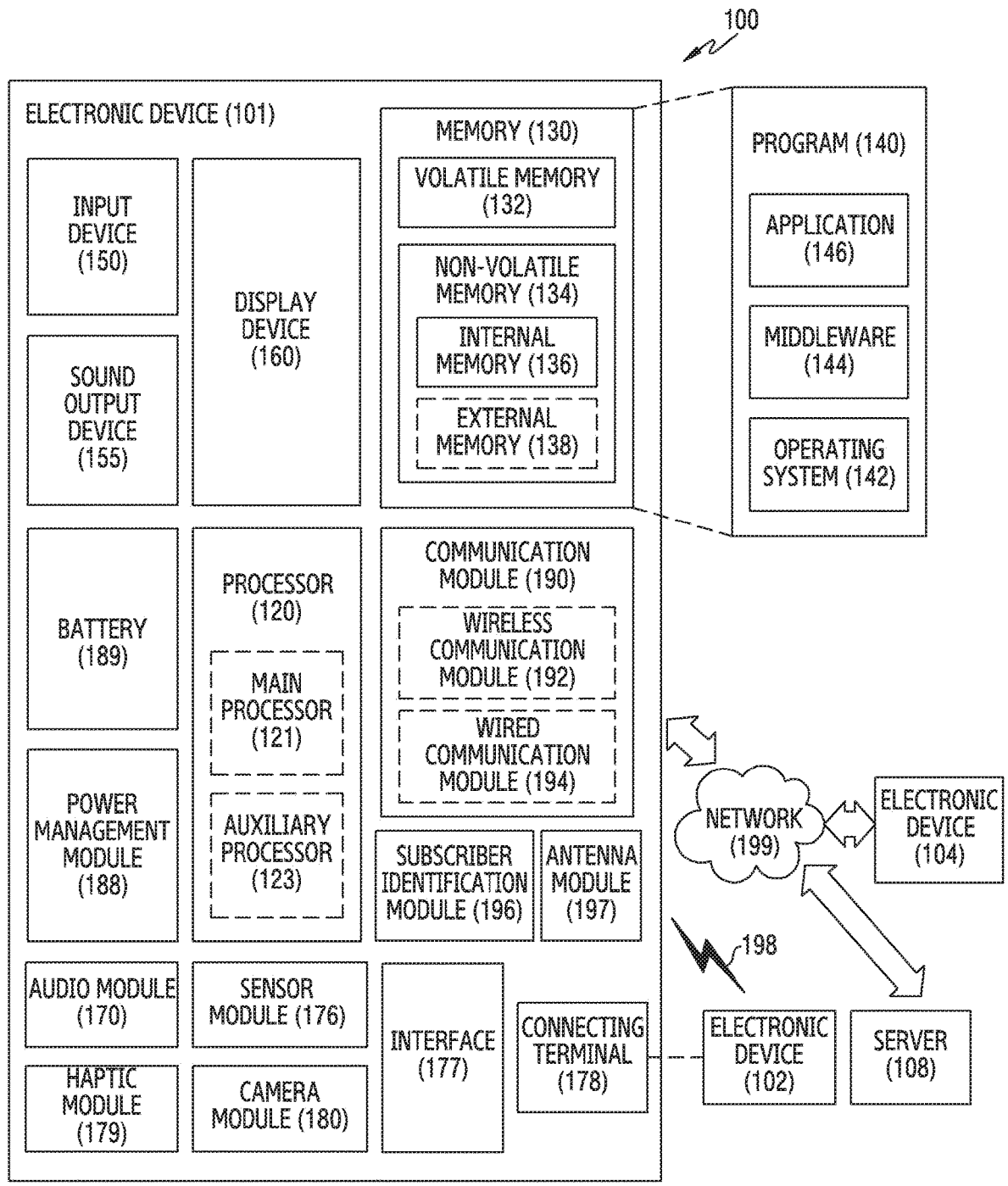
FIG. 1 is a block diagram of an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment of the disclosure, the electronic device 101 may communicate with the electronic device 104 via the server 108. According to an embodiment of the disclosure, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments of the disclosure, at least one (e.g., the display device 160 or the camera module 180) of the components may be omitted from the electronic device 101, or one or more other components may be added in the electronic device 101. In some embodiments of the disclosure, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment of the disclosure, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment of the disclosure, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment of the disclosure, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment of the disclosure, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment of the disclosure, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment of the disclosure, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

Figure 2:
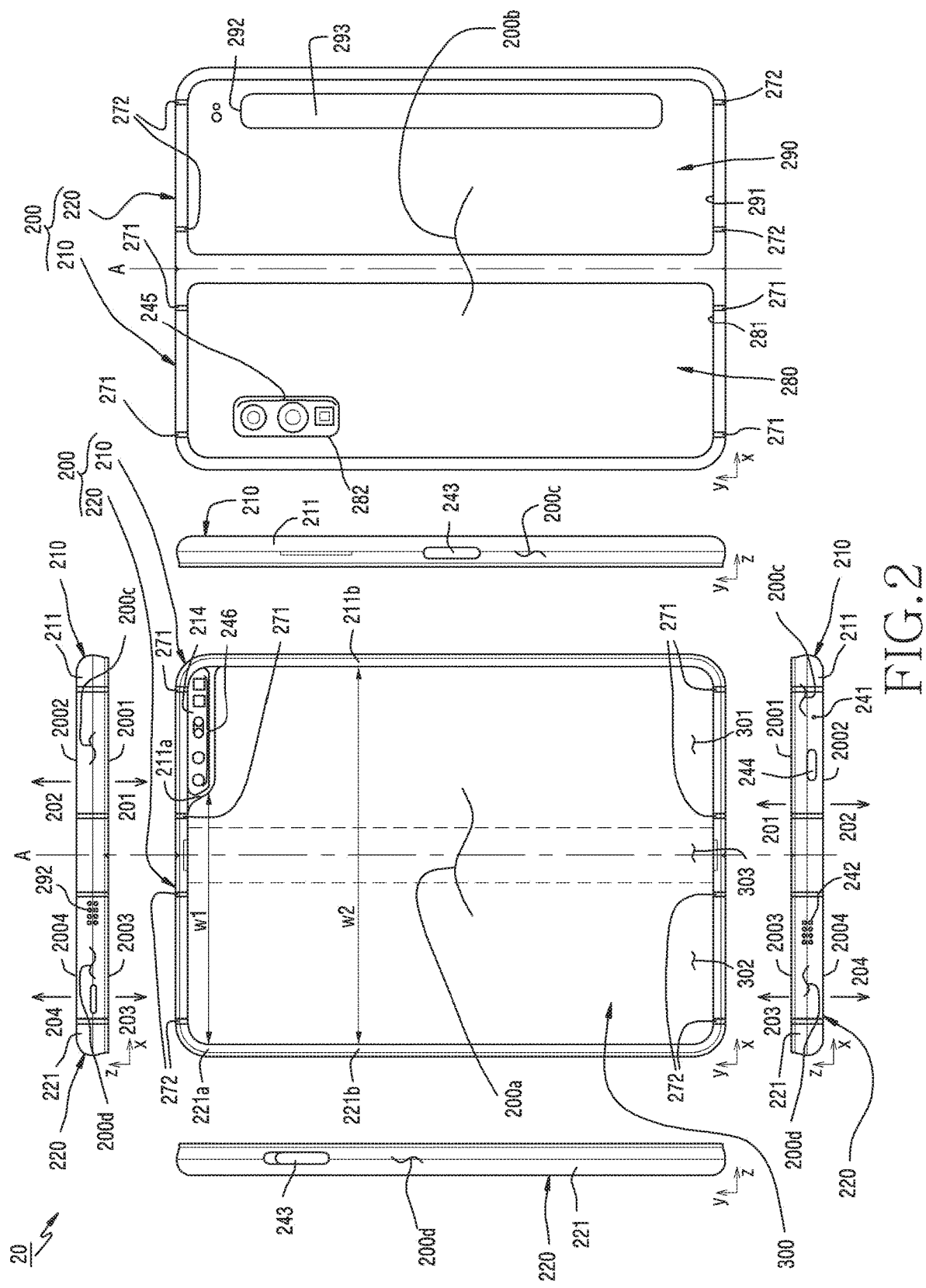
FIG. 2 illustrates an unfolded state of an electronic device, and illustrates a six-sided view (a front view, a back view, a top view, a bottom view, a right view, and a left view) according to an embodiment of the disclosure.
Figure 3:
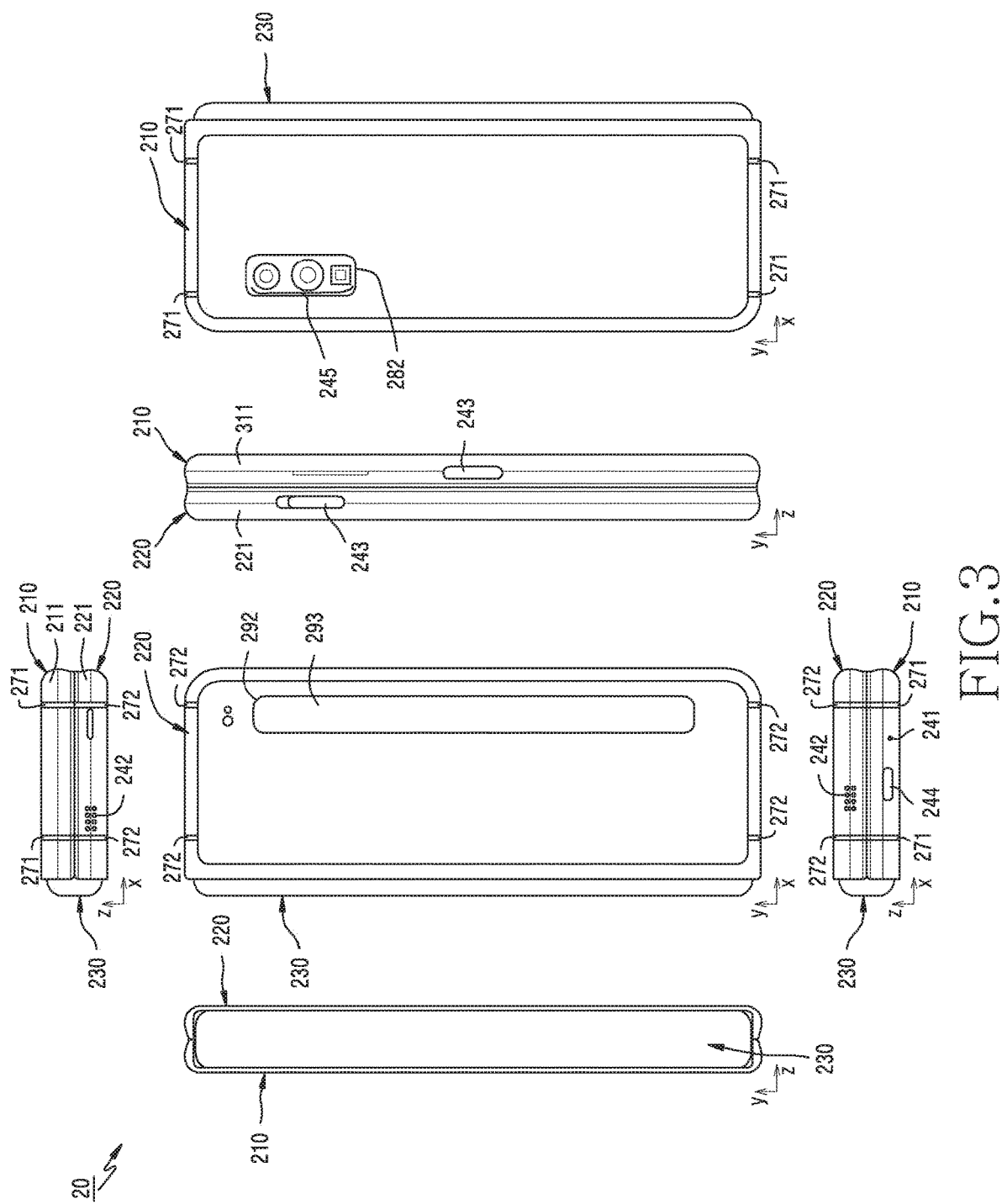
FIG. 3 illustrates a folded state of an electronic device, and illustrates a six-sided view (a front view, a back view, a top view, a bottom view, a right view, and a left view) according to an embodiment of the disclosure.

FIG. 2 illustrates a flat or unfolded state of an electronic device according to an embodiment of the disclosure. FIG. 3 illustrates a folded state of an electronic device according to an embodiment of the disclosure.

Referring to FIGS. 2 and 3, in an embodiment of the disclosure, an electronic device 20 (e.g., the electronic device 101 of FIG. 1) may include a foldable housing 200, a hinge cover 230 covering a foldable portion of the foldable housing 200, and a flexible or foldable display 300 (hereinafter, simply a "display" 300) (e.g., the display device 160 of FIG. 1) disposed in a space constructed by the foldable housing 200. According to an embodiment of the disclosure, the foldable housing 200 may include a front face 200a through which the display 300 is exposed, a rear face 200b facing away from the front face 200a, and side faces 200c and 200d surrounding a space between the front face 200a and the rear face 200b.

According to an embodiment of the disclosure, the foldable housing 200 may include a first housing structure 210 and a second housing structure 220 which are coupled by a hinge structure (not shown). For example, regarding the hinge structure, the first housing structure 210 may be coupled with the second housing structure 220 in a rotatable manner by the hinge structure.

According to an embodiment of the disclosure, the first housing structure 210 may include a first face 2001 facing a first direction 201, a second face 2002 facing a second direction 202 opposite to the first direction 201, and a first side face 200c surrounding at least part of a space between the first face 2001 and the second face 2002. The second housing structure 220 may include a third face 2003 facing a third direction 203, a fourth face 2004 facing a fourth direction 204 opposite to the third direction 203, and a second side face 200d surrounding at least part of a space between the third face 2003 and the fourth face 2004. The front face 200a of the electronic device 20 may include the first face 2001 and the third face 2003, and the rear face 200b of the electronic device 20 may include the second face 2002 and the fourth face 2004. In various embodiments (not shown), the first housing structure 210 may refer to a structure which constructs some of the first face 2001, the second face 2002, and the first side face 200c. In various embodiments (not shown), the second housing structure 220 may refer to a structure which constructs some of the third face 2003, the fourth face 2004, and the second side face 200d.

According to an embodiment of the disclosure, the foldable housing 200 may include a transparent plate (not shown) (e.g., a polymer plate including various coating layers) which constructs the first face 2001 and the third face 2003. The display 300 may be disposed along the transparent plate, and may be exposed through the first face 2001 and the third face 2003. The transparent plate may have flexibility to enable a folded state of the electronic device 20. According to an embodiment of the disclosure, the display 300 may be implemented to include a transparent plate, and the transparent plate may be omitted in the foldable housing 200.

According to an embodiment of the disclosure, the first housing structure 210 may include a first back cover 280 disposed to one side of a folding axis A to construct at least part of the second face 2002. For example, the first back cover 280 may have a substantially rectangular periphery 281, and the periphery 281 may be surrounded by a first side member 211. According to various embodiments of the disclosure, the first side member 211 and the first back cover 280 may be constructed integrally, and may include the same material.

According to an embodiment of the disclosure, the second housing structure 220 may include a second back cover 290 disposed to the other side of the folding axis A to construct at least part of the fourth face 2004. For example, the second back cover 290 may have a substantially rectangular periphery 291, and the periphery 291 may be surrounded by a second side member 221. According to various embodiments of the disclosure, the second side member 221 and the second back cover 290 may be constructed integrally, and may include the same material.

According to various embodiments of the disclosure, the first back cover 280 and/or the second back cover 290 may be constructed by, for example, coated or colored glass, ceramic, polymer, metal (e.g., aluminum, stainless steel (STS), or magnesium), or a combination of at least two of these materials.

According to an embodiment of the disclosure, the first back cover 280 and the second back cover 290 may have a generally symmetrical shape about the folding axis A. The first back cover 280 and the second back cover 290 do not necessarily have a mutually symmetrical shape. In another embodiment of the disclosure, the first back cover 280 and/or the second back cover 290 may be provided in various other shapes.

According to an embodiment of the disclosure, the first housing structure 210 may include the first side member (or a first side bezel structure) 211 constructing the first side face 200c, and the second housing structure 220 may have the second side member (or a second side bezel structure) 221 constructing the second side face 200d. The first side member 211 and/or the second side member 221 may include metal or polymer.

According to various embodiments of the disclosure, the first side member 211 and the second side member 221 may extend to construct an edge region of the front face 200a. For example, the front face 200a of the electronic device 20 may be constructed of the display 300, a partial region of the first side member 211, adjacent to the display 300, and a partial region of the second side member 221.

According to various embodiments of the disclosure, a partial region (not shown) of the first side member 211, adjacent to the periphery 281 of the first back cover 280, and/or a partial region (not shown) of the second side member 221, adjacent to an edge 291 of the second back cover 290, may construct part of the rear face 200b. For example, the rear face 200b of the electronic device 20 may be constructed of the first back cover 280, a partial region of the first side member 211, adjacent to the first back cover 280, the second back cover 290, and a partial region of the second side member 221, adjacent to the second back cover 290.

According to an embodiment of the disclosure, the first side member 211 and the second side member 221 may be disposed at both sides about the folding axis A, and may have a shape which is generally symmetrical about the folding axis A.

According to an embodiment of the disclosure, the first housing structure 210 may further include a component disposition region 214 extending from the first side member 211 or coupled to the first side member 211 to construct the first face 2001 together with the display 300. A region of the first side member 211, other than the component disposition region 214, may have a shape mutually symmetrical to the second side member 221. At least one component utilizing the first face 2001 may be disposed to the component disposition region 214. According to an embodiment of the disclosure, the component disposition region 214 may be constructed to have a region configured adjacent to a corner of the first side member 211. According to various embodiments of the disclosure, a disposition, shape, and size of the component disposition region 214 are not limited to the illustrated example. For example, in another embodiment of the disclosure, the component disposition region 214 may be provided at another corner of the first side member 211 or any region between a top corner and a bottom corner. Components for performing various functions embedded in the electronic device 20 may be exposed to the first face 2001 through the component disposition region 214 or through one or more openings (not shown) provided through the component disposition region 214. According to an embodiment of the disclosure, a component 246 disposed to the component disposition region 214 may include at least one of various sensors, such as a proximity sensor, a front camera, a light emitting element, and a receiver. For example, the light emitting element may provide state information of the electronic device 20 in an optical form. In another embodiment, the light emitting element may provide, for example, a light source interworking with an operation of the front camera. The light emitting element may include, for example, a light emitting diode (LED), an IR LED, and a xenon lamp.

According to an embodiment of the disclosure, the electronic device 20 may include at least one of audio modules (i.e., microphone hole 241 and the speaker hole 242), a key input device 243, and a connector hole 244.

According to an embodiment of the disclosure, the microphone hole 241 may be disposed inside a microphone to acquire a sound of the outside. In some embodiments of the disclosure, a plurality of microphones may be disposed to detect a direction of the sound. The speaker hole 242 may include an external speaker hole or a receiver hole for a call. In some embodiments of the disclosure, the speaker hole 242 and the microphone hole 241 may be implemented as a single hole, or a speaker (e.g., a piezo speaker) may be included without the speaker hole 242.

According to an embodiment of the disclosure, the key input device 243 may be disposed to the side faces 200c and 200d of the folder housing 200. In another embodiment of the disclosure, the electronic device 20 may not include some or all of the key input devices 243 mentioned above, and the key input devices 243 which are not included may be implemented on the display 300 in another form, such as a soft key or the like. In some embodiments of the disclosure, the key input device may include a sensor module (e.g., one or more components 245 disposed to a first rear region 282) disposed to the second face 2002 of the first housing structure 210.

According to an embodiment of the disclosure, the connector hole 244 may include a first connector hole capable of accommodating a connector (e.g., a USB connector) for transmitting and receiving power and/or data to and from an external electronic device, and/or a second connector hole (e.g., an earphone jack) capable of accommodating a connector for transmitting and receiving an audio signal to and from the external electronic device. The position or number of connector holes is not limited to the example of FIG. 3, and may be constructed differently.

In another embodiment (not shown), at least one of an audio module (e.g., a receiver for a call), a sensor module (e.g., a proximity sensor or a fingerprint sensor), a camera module (e.g., a front camera), and a light emitting element may be included in a rear face of a screen display region of the display 300. In another embodiment (not shown), the display 300 may be disposed adjacent to or bonded to a touch sensing circuit, a pressure sensor capable of measuring touch strength (pressure), and/or a digitizer for detecting a stylus pen of a magnetic field type.

In an embodiment of the disclosure, the first housing structure 210 and the second housing structure 220 may construct a recess which is a space in which the display 300 is disposed. In the illustrated embodiment of the disclosure, due to the component disposition region 214, the recesses may have two or more different widths in a direction perpendicular to the folding axis A.

For example, the recess may include a first width w1 between a first portion 221a of the second side member 221, parallel to the folding axis A, and a first portion 211a of the first side member 211, constructed at an edge of the component disposition region 214. The recess may include a second width w2 between a second portion 221b of the second side member 221 and a second portion 211b of the first side member 211, not corresponding to the component disposition region 214 and parallel to the folding axis A. The second width w2 may be longer than the first width w1. According to an embodiment of the disclosure, the first portion 211a of the first housing structure 210 and the first portion 221a of the second housing structure 220, which have a mutually asymmetric shape, may construct the first width w1 of the recess, and the second portion 211b of the first housing structure 210 and the second portion 221b of the second housing structure 220, which have a mutually symmetric shape, may construct the second width w2. According to an embodiment of the disclosure, the first portion 221a and second portion 221b of the second housing structure 220 may have different distances from the folding axis A. The width of the recess is not limited to the illustrated example. According to various embodiments of the disclosure, the recess may have a plurality of widths due to a portion having a shape of the component disposition region 214 or an asymmetrical shape of the first housing structure 210 and second housing structure 220.

According to various embodiments of the disclosure, one or more components may be disposed or visually exposed to the rear face 200b of the electronic device 20. For example, at least part of a sub display 293 may be visually exposed through a second rear region 292 of the second back cover 290. For example, one or more of the components 245 may be visually exposed through the first rear region 282 of the first back cover 280. In various embodiments of the disclosure, one or more of the components 245 may include a sensor (e.g., a proximity sensor, a heart rate sensor) and/or a rear camera.

Referring to FIG. 3, the hinge cover 230 may be disposed between the first housing structure 210 and the second housing structure 220 to cover an internal component (e.g., a hinge structure). According to some embodiments of the disclosure, the hinge structure may be referred to as an element including the hinge cover 230. In an embodiment of the disclosure, the hinge cover 230 may be obscured by part of the first housing structure 210 and second housing structure 220, or exposed to the outside, according to a state (e.g., an unfolded state or a folded state) of the electronic device 20.

For example, when the electronic device 20 is in the unfolded state as shown in FIG. 2, the hinge cover 230 may be obscured by the first housing structure 210 and the second housing structure 220 and thus may not be exposed. For example, when the electronic device 20 is in the folded state (e.g., a fully folded state) as shown in FIG. 3, the hinge cover 230 may be exposed to the outside between the first housing structure 210 and the second housing structure 220. For example, when the electronic device 20 is in an intermediate state in which the first housing structure 210 and the second housing structure 220 are folded with a certain angle (e.g., a state between the unfolded state and the folded state), the hinge cover 230 may be exposed in part to the outside between the first housing structure 210 and the second housing structure 220. An exposed region of the hinge cover 230 in the intermediate state may be smaller than an exposed region of the hinge cover 230 in the fully folded state. In an embodiment of the disclosure, the hinge cover 230 may include a curved face, and the curved face may construct one side face of the electronic device 20 in the folded state.

According to various embodiments of the disclosure, the display 300 may imply a display in which at least a partial region can be changed to a flat face or a curved face. In an embodiment of the disclosure, referring to FIG. 2, the display 300 may include a folding region 303, a first region 301 disposed to one side (a right side of the folding region 303) with respect to the folding region 303, and a second region 302 disposed to the other side (a left side of the folding region 303).

According to various embodiments of the disclosure, the division of the region of the display 300 of FIG. 2 is shown for purposes, and the display 300 may be divided into a plurality of (e.g., at least 4 or 2) regions depending on a structure or function. For example, in an embodiment of FIG. 2, a region of the display 300 may be divided depending on the folding region 303 extending parallel to a y-axis or the folding axis A. In another embodiment of the disclosure, the region of the display 300 may be divided depending on another folding region (e.g., a folding region parallel to an x-axis) or another folding axis (e.g., a folding axis parallel to the x-axis).

According to an embodiment of the disclosure, the first region 301 and second region 302 of the display 300 may have a shape generally symmetrical about the folding region 303. According to an embodiment of the disclosure, the second region 302 may include a notch which is cut depending on the presence of the component disposition region 214, unlike the first region 301. The other regions may have a shape symmetrical about the first region 301 and the folding region 303. For example, the first region 301 and the second region 302 may include portions having a shape symmetrical about the folding region 303 and portions having mutually symmetrical shapes.

According to an embodiment of the disclosure, an angle or distance between the first housing structure 210 and the second housing structure 220 may vary depending on the unfolded state, the folded state, or the intermediate state of the foldable housing 200. Hereinafter, an operation of the first housing structure 210 and second housing structure 220 and each region of the display 300 will be described according to a state (e.g., the unfolded state and the folded state) of the electronic device 20.

According to an embodiment of the disclosure, when the electronic device 20 is in the unfolded state (see FIG. 2), the first direction 201 facing the first face 2001 of the first housing structure 210 may be the same as the third direction 203 facing the third face 2003 of the second housing structure 220. For example, in the unfolded state, the first face 2001 of the first housing structure 210 and the third face 2003 of the second housing structure 220 may be disposed to form an angle of about 180 degrees and face the same direction (e.g., a direction facing the front face 200a of the electronic device 20). In a state where the electronic device 20 is unfolded, the surface of the first region 301 of the display 300 and the surface of the second region 302 may form an angle of about 180 degrees and may face the same direction (e.g., a direction facing the front face 200a of the electronic device 20). The folding region 303 of the display 300 may be coplanar with the first region 301 and the second region 302.

In an embodiment of the disclosure, when the electronic device 20 is in the folded state (see FIG. 3), the first housing structure 210 and the second housing structure 220 may be disposed to face each other. For example, in the folded state, the first face 2001 of the first housing structure 210 and the third face 2003 of the second housing structure 220 may face each other. In the folded state, the surface of the first region 301 of the display 300 and the surface of the second region 302 may form a narrow angle with each other (e.g., in the range about 0 to 10 degrees) and may face each other. In the folded state, the folding region 303 may be constructed of a curved face at least partially having a predetermined curvature.

In an embodiment of the disclosure, when the electronic device 20 is in the intermediate state (e.g., a state between the unfolded state and the folded state), the first housing structure 210 and the second housing structure 220 may be disposed to have a certain angle from each other. In the intermediate state, the first face 2001 of the first housing structure 210 and the third face 2003 of the second housing structure 220, or the surface of the first region 301 of the display 300 and the surface of the second region 302 may form an angle greater than that in the folded state and smaller than that in the unfolded state. In the intermediate state, the folding region 303 may be constructed of a curved face having at least a predetermined curvature. In this case, the curvature may be smaller than that in the folded state.

According to an embodiment of the disclosure, the first side member 211 may include a plurality of second conductive portions (not shown) which are physically or electrically separated. Non-conductive members 271 may be disposed between the plurality of second conductive portions. According to an embodiment of the disclosure, the non-conductive member 271 may extend from a first non-conductive internal structure (not shown) disposed inside the first housing structure 210. The first internal structure may be coupled with the first side member 211, thereby maintaining the plurality of second conductive portions in a physically separated state due to the first internal structure. For example, the first internal structure may be constructed to be coupled with the first side member 211 due to insert injection.

According to an embodiment of the disclosure, the second side member 221 may include a plurality of third conductive portions (not shown) which are physically or electrically separated. Non-conductive members 272 may be disposed between the plurality of third conductive portions. According to an embodiment of the disclosure, the non-conductive member 272 may extend from a second non-conductive internal structure (not shown) disposed inside the second housing structure 220. The second internal structure may be coupled with the second side member 221, thereby maintaining the plurality of third conductive portions in a physically separated state due to the second internal structure. For example, the second internal structure may be constructed to be coupled with the second side member 221 due to insert injection.

According to an embodiment of the disclosure, at least one of the plurality of second conductive portions of the first side member 221 may be electrically coupled with a wireless communication circuit (e.g., the wireless communication module 192 of FIG. 1) and thus may be utilized as an antenna (or an antenna radiator).

Referring to FIG. 3, when the electronic device 20 is in the folded state, the second side member 221 and the first side member 211 are adjacent, and wireless communication using at least one of the second conductive portions as an antenna may be electrically influenced by the second side member 221. For example, in the folded state, the second side member 221 may degrade performance of wireless communication (e.g., antenna radiation performance) which utilizes at least one of the second conductive portions as an antenna. For example, electromagnetic wave energy (or an electromagnetic field) emitted from at least one of the second conductive portions utilized as the antenna may be interfered by the second side member 221. According to an embodiment of the disclosure, in order to reduce this electrical influence, it may be designed such that the non-conductive members 271 of the first side member 211 and the non-conductive members 272 of the second side member 221 are aligned with each other in the folded state.

Referring to FIG. 3, although the non-conductive members 271 of the first side member 211 and the non-conductive members 272 of the second side member 221 are aligned with each other in the folded state to improve antenna radiation performance, it may be difficult to secure the antenna radiation performance with at least a set value due to electrical coupling between second and third conductive portions adjacent to each other. For example, capacitance may be formed in the folded state by electromagnetic coupling between the second conductive portion and the third conductive portion, and electromagnetic wave energy (or electromagnetic field) emitted from the second conductive portion utilized as an antenna may be induced to the third conductive portion. Due to the induced electromagnetic wave energy, reverse current may be formed in the third conductive portion, unlike forward current flowing in the second conductive portion. Accordingly, antenna radiation performance thereof may deteriorate in wireless communication which utilizes at least one of the second conductive portions as an antenna. According to an embodiment of the disclosure, at least one conductive portion capable of securing antenna radiation performance based on the folded state or the unfolded state may be selectively electrically coupled with a wireless communication circuit (e.g., the wireless communication module 192 of FIG. 1).

According to an embodiment of the disclosure, a hinge structure (e.g., the hinge cover 230) may include at least one first conductive portion. According to an embodiment of the disclosure, when the electronic device 20 is in the folded state, the wireless communication circuit (e.g., the wireless communication module 192 of FIG. 1) may be electrically coupled with at least one of the second conductive portions of the first side member 211 and at least one of the first conductive portions of the hinge structure (e.g., the hinge cover 230), and may transmit or receive a signal having a selected (or designated) frequency by utilizing the at least one first conductive portion as an antenna. For example, referring to FIG. 3, when the electronic device 20 is in the folded state, the at least one first conductive portion of the hinge structure (e.g., the hinge cover 230) may not be at least in part covered by the first side member 211 and the second side member 221, and thus may be utilized as an antenna in the folded state of the electronic device 20.

According to an embodiment of the disclosure, when the electronic device 20 is in the unfolded state, the wireless communication circuit may be electrically coupled with at least one of the second conductive portions of the first side member 211, and may transmit or receive a signal having the selected frequency by utilizing the at least one of the second conductive portions as an antenna. According to an embodiment of the disclosure, when the electronic device 20 is in the unfolded state, the at least one first conductive portion of the hinge structure (e.g., the hinge cover 230) may not be electrically coupled with the wireless communication circuit.

According to an embodiment of the disclosure, the at least one first conductive portion of the hinge structure (e.g., the hinge cover 230) may be electrically coupled or not coupled with the wireless communication circuit, when the electronic device 20 is in the folded state or the unfolded state, by means of a method of controlling at least one switch disposed between the at least one first conductive portion and the wireless communication circuit (e.g., the wireless communication module 192 of FIG. 1).

According to various embodiments of the disclosure, when the electronic device 20 is in the folded state, a first contact (not shown) constructed on at least one first conductive portion of the hinge structure (e.g., the hinge cover 230) or electrically coupled therewith may be physically in contact with a second contact (not shown) electrically coupled therewith. When the first contact and the second contact are physically in contact, at least one first conductive portion of the hinge structure and the wireless communication circuit may be electrically coupled. When the electronic device 20 is in the unfolded state, the first contact and the second contact may be physically separated. When the first contact and the second contact are physically separated, the at least one first conductive portion of the hinge structure and the wireless communication circuit may not be electrically coupled.

According to an embodiment of the disclosure, at least one of the second conductive portions of the first side member 211 may be electrically coupled or not coupled with the wireless communication circuit (e.g., the wireless communication module 192 of FIG. 1), when the electronic device 20 is in the folded state or the unfolded state, by means of a method of controlling at least one switch disposed between at least one of the second conductive portions and the wireless communication circuit.

According to an embodiment of the disclosure, the electronic device 20 may detect the unfolded state or the folded state by utilizing at least one sensor. Various other devices or methods may be utilized to detect the unfolded or folded state of the electronic device 20.

Figure 4:
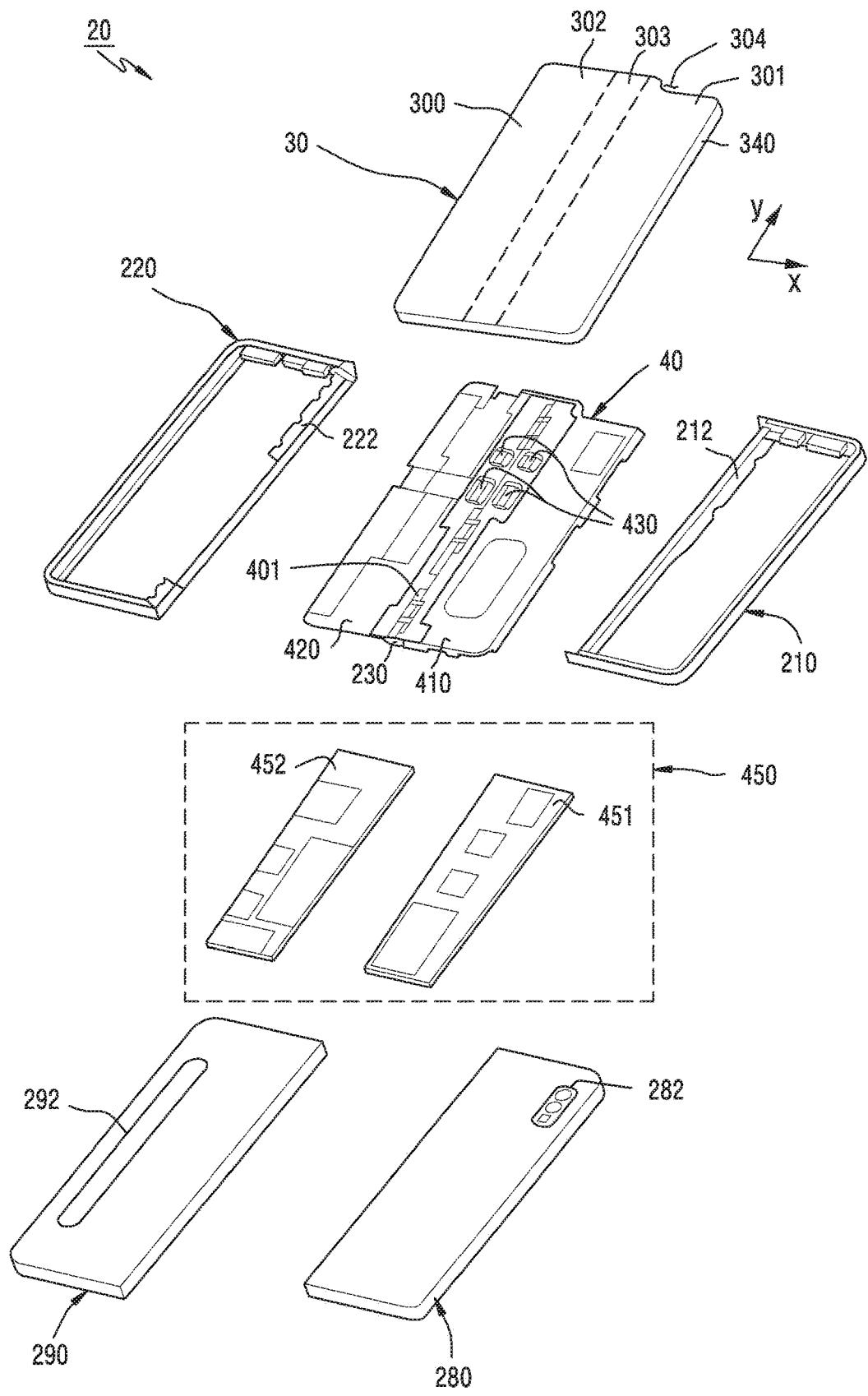
FIG. 4 is an exploded perspective view of an electronic device of FIG. 2 or 3 according to an embodiment of the disclosure.

FIG. 4 is an exploded perspective view of the electronic device 20 of FIG. 2 or 3 according to an embodiment of the disclosure.

Referring to FIG. 4, in an embodiment of the disclosure, the electronic device 20 may include a display unit 30, a support member assembly 40, a substrate portion 450, the first housing structure 210, the second housing structure 220, and at least one of the first back cover 280 and the second back cover 290. In this document, the display unit 30 may be referred to as a display module or a display assembly.

The display 30 may include, for example, the display 300 and one or more plates or layers 340 on which the display 300 is mounted. In an embodiment of the disclosure, the plate 340 may be disposed between the display 300 and the support member assembly 40. The display 300 may be disposed on at least part of one face (e.g., an upper face according to FIG. 4) of the plate 340. The plate 340 may be constructed in a shape corresponding to the display 300. For example, a partial region of the plate 340 may be constructed in a shape corresponding to a notch 304 of the display 300.

According to an embodiment of the disclosure, the support member assembly 40 may include a first support member 410, a second support member 420, a hinge structure 401 disposed between the first support member 410 and the second support member 420, the hinge cover 230 which covers the hinge structure 401 when viewed from the outside, and a wiring member 430 (e.g., a Flexible Printed Circuit (FPC)) which crosses the first support member 410 and the second support member 420.

In an embodiment of the disclosure, the support member assembly 40 may be disposed between the plate 340 and the substrate portion 450. For example, the first support member 410 may be disposed between the first region 301 of the display 300 and a first substrate (e.g., a first Printed Circuit Board (PCB)) 451. The second support member 420 may be disposed between the second region 302 of the display 300 and a second substrate (e.g., a second PCB) 452.

According to an embodiment of the disclosure, at least part of the wiring member 430 and hinge structure 401 may be disposed inside the support member assembly 40. The wiring member 430 may be disposed in a direction (e.g., an x-axis direction) transverse to the first support member 410 and the second support member 420. The wiring member 430 may be disposed in a direction (e.g., the x-axis direction) perpendicular to a folding axis (e.g., a y-axis or the folding axis A of FIG. 2) of the folding region 303 of the display 300.

According to an embodiment of the disclosure, the substrate portion 450 may include the first substrate 451 disposed on the first support member 410 and the second substrate 452 disposed on the second support member 420. The first substrate 451 and the second substrate 452 may be disposed inside a space constructed by the support member assembly 40, the first housing structure 210, the second housing structure 220, the first back cover 280, and the second back cover 290. Components for implementing various functions of the electronic device 20 may be mounted on the first substrate 451 and the second substrate 452.

According to an embodiment of the disclosure, the hinge structure 401 or the hinge cover 230 may include at least one first conductive portion. According to an embodiment of the disclosure, the electronic device 20 may selectively utilize at least one first conductive portion or at least one of second conductive portions as an antenna for a communication mode which utilizes a corresponding frequency band, based on the folded state or the unfolded state. According to an embodiment of the disclosure, when the electronic device 20 is in the folded state, a wireless communication circuit (e.g., the wireless communication module 192 of FIG. 1) mounted on the first substrate 451 may be electrically coupled with at least one first conductive portion included in the hinge structure 401 or hinge cover 230. According to an embodiment of the disclosure, when the electronic device 20 is in the unfolded state, the wireless communication circuit may be electrically coupled with at least one of the second conductive portions included in the first side member. According to an embodiment of the disclosure, when the electronic device 20 is in the unfolded state, the wireless communication circuit may not be electrically coupled with at least one first conductive portion included in the hinge structure 401 or hinge cover 230.

According to an embodiment of the disclosure, the first housing structure 210 and the second housing structure 220 may be assembled with each other so as to be coupled to both sides of the support member assembly 40 in a state where the display unit 30 is coupled to the support member assembly 40. According to various embodiments of the disclosure, the first housing structure 210 and the second housing structure 220 may be coupled with the support member assembly 40 by sliding at both sides of the support member assembly 40.

In an embodiment of the disclosure, the first housing structure 210 may include a first rotational support face 212, and the second housing structure 220 may include a second rotational support face 222 corresponding to the first rotational support face 212. The first rotation support face 212 and the second rotation support face 222 may include a curved face corresponding to a curved face included in the hinge cover 230.

In an embodiment of the disclosure, when the electronic device 20 is in the unfolded state (see FIG. 2), the first rotational support face 212 and the second rotational support face 222 may cover the hinge cover 230, and the hinge cover 230 may not be exposed to the rear face of the electronic device 20 or may be exposed to the minimum extent possible. When the electronic device 20 is in the folded state (see FIG. 3), the hinge cover 230 may be exposed to the maximum extent possible between the first rotational support face 212 and the second rotational support face 222. According to an embodiment of the disclosure, the hinge cover 230 may be electrically coupled with a wireless communication circuit (e.g., the wireless communication module 192 of FIG. 1) in the folded state of the electronic device 20, and thus may be utilized as an antenna for securing antenna performance.

Hereinafter, a structure of a foldable electronic device according to various embodiments of the disclosure will be described with reference to the accompany drawings. A Cartesian coordinate system is used. An X-axis may mean a horizontal direction of the electronic device. A Y-axis may mean a vertical direction of the electronic device. A Z-axis may mean a thickness direction of the electronic device.

Figure 5A:
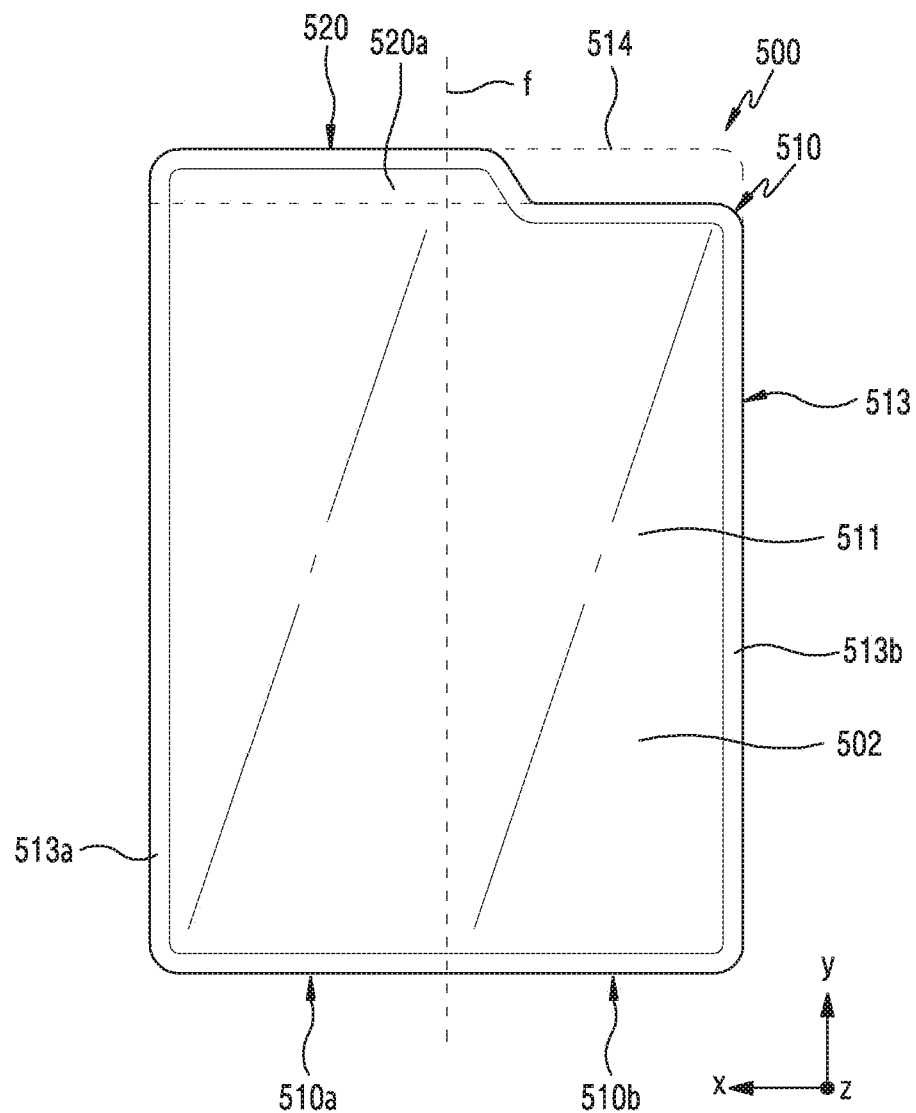
FIG. 5A is a top view illustrating an electronic device of an unfolded state according to an embodiment of the disclosure.
Figure 5B:
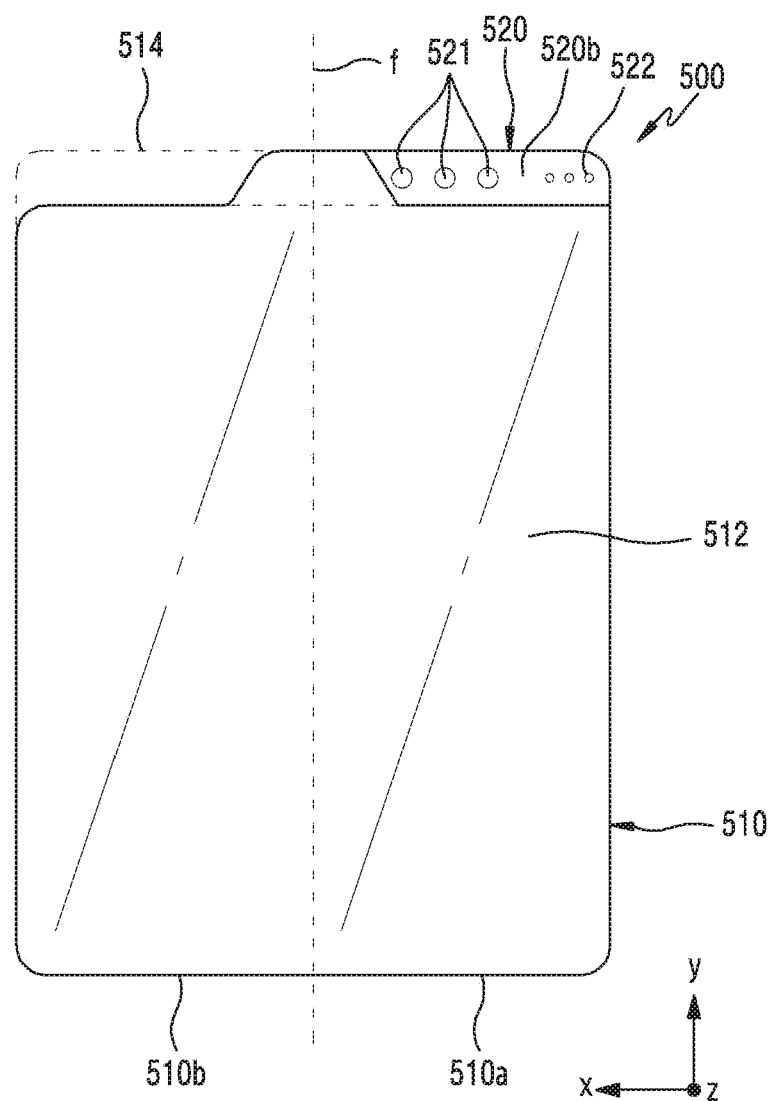
FIG. 5B is a bottom view illustrating an electronic device of an unfolded state according to an embodiment of the disclosure.
Figure 5C:
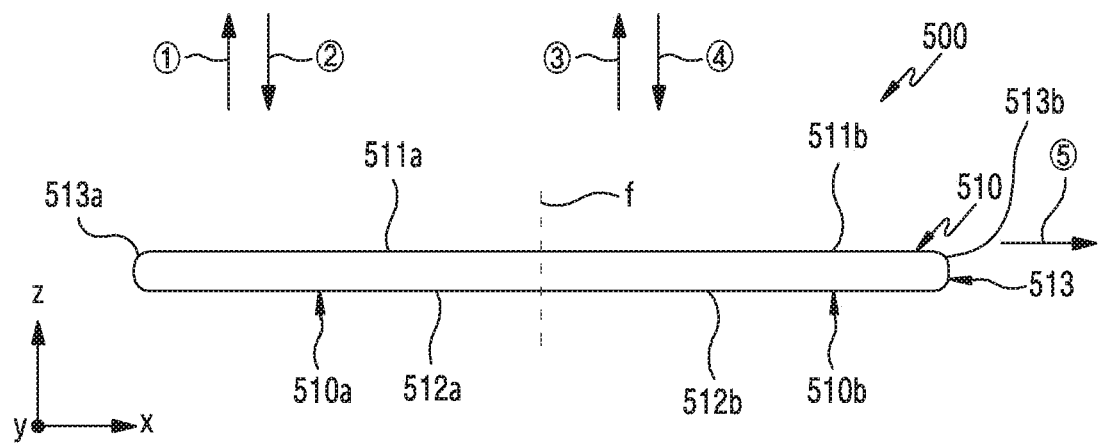
FIG. 5C is a side view illustrating an electronic device of an unfolded state according to an embodiment of the disclosure.

FIG. 5A is a top view illustrating an electronic device of an unfolded state according to an embodiment of the disclosure. FIG. 5B is a bottom view illustrating an electronic device of an unfolded state according to an embodiment of the disclosure. FIG. 5C is a side view illustrating an electronic device of an unfolded state according to an embodiment of the disclosure.

Referring to FIGS. 5A to 5C, an electronic device 500 (e.g., the electronic device 101 of FIG. 1 or the electronic device 20 of FIG. 2) according to an embodiment may include a housing 510 (e.g., the housing 200 of FIG. 2) capable of protecting a plurality of electronic components and constructing an exterior.

According to an embodiment of the disclosure, the housing 510 may include a first housing structure 510a and a second housing structure 510b. According to an embodiment, the first and second housing structures 510a and 510b may be coupled by a hinge structure or a folding structure. According to an embodiment of the disclosure, the second housing structure 510b may be folded on the first housing structure 510a or unfolded from the first housing structure 510b by the hinge structure or the folding structure.

According to an embodiment of the disclosure, the housing 510 may include a first plate 511, a second plate 512 opposite to the first plate 511, a second plate 512, and a side member 513 surrounding at least part of a space between the first plate 511 and the second plate 512.

According to an embodiment of the disclosure, the first plate 511 may be constructed of a polymer plate or glass plate including various coating layers.

According to an embodiment of the disclosure, the second plate 512 may be constructed of a substantially transparent, translucent, or opaque material. The second plate 512 may be constructed by, for example, coated or colored glass, ceramic, polymer, metal (e.g., aluminum, stainless steel (STS), or magnesium), or a combination of at least two of the above materials.

According to an embodiment of the disclosure, the side member 513 may be coupled with the first plate 511, and may be constructed by a side bezel structure including metal and/or polymer. In some embodiments of the disclosure, the second plate 512 and the side member 513 may be constructed integrally, and may include the same material (e.g., a metal material, such as aluminum).

According to an embodiment of the disclosure, the first plate 511 may include first and third faces 511a and 511b, the second plate 512 may include second and fourth faces 512a and 512b, and the side member 513 may include first and second side members 512a and 513b. According to an embodiment of the disclosure, the third face 511b may extend from the first face 511a. The fourth face 512b may extend from the second face 512a. The second side member 513b may extend from the first side member 513a. For example, the first and third faces 511a and 511b may be one face. The second and fourth faces 512a and 512b may be one face. The first and second side members 513a and 513b may be one member.

According to an embodiment of the disclosure, the first plate 511 may include a first face 511a included in the first housing structure facing a first direction ① and a third face 511b included in the second housing structure facing a third direction ③. The second plate 512 may include the second face 512a included in the first housing structure facing a second direction ② and the fourth face 512b included in the second housing structure facing a fourth direction ④ opposite to the third direction ③. According to an embodiment of the disclosure, at least part of the first plate 511 may be a display region, and at least part of the second plate 512 may be a component mounting region to which components are disposed. For example, the side member 513 may be constructed of a metal material in a segmented form (e.g., in a state where a metal portion is spaced apart by a non-metal portion), and thus may serve as an antenna radiator. However, the second plate 512 is not necessarily limited to the component mounting region, and a second display or an auxiliary display may be disposed.

According to an embodiment of the disclosure, in the folded state, the first face 511a may face the third face 511b. In the unfolded state, the third direction ③ may be the same direction as the first direction ①.

According to an embodiment of the disclosure, the first side member 513a may be constructed in a shape surrounding at least part of a space between the first face 511a and the second face 511b, and the second side member 513b may be constructed in a shape surrounding at least part of a space between the third face 512a and the fourth face 512b.

According to an embodiment of the disclosure, the electronic device 500 may include a flexible display 502 disposed on at least part of the first plate 511. The flexible display 502 may be folded or unfolded along a folding line f. A folding type may include an out-folding type in which folding is achieved such that a display region is visible to the outside or an in-folding type in which folding is achieved such that the display region is not visible to the outside. For example, the flexible display 502 may be disposed adjacent to or combined with a touch sensing circuit, a pressure sensor capable of measuring intensity (pressure) of the touch, and/or a digitizer detecting a stylus pen of a magnetic field type.

The flexible display 502 according to an embodiment may operate in the out-folding manner in which folding is achieved such that the display region is not visible to the outside, when folded along the folding line f. According to an embodiment of the disclosure, the flexible display 502 may extend from the first face 511a to the third face 511b.

According to an embodiment of the disclosure, the housing 510 may include at least one component, for example, a camera mounting portion 520 to which a camera 521 is mounted. Since a plurality of cameras may be disposed to the camera mounting portion 520, it will be referred to hereinafter as a camera mounting region.

According to an embodiment of the disclosure, when the electronic device 500 is in the folded state, a first portion 514 of the second housing structure 510b, overlapping with the camera mounting region 520, may be cut. In an embodiment of the disclosure, the first portion 514 may have an opening shape. According to an embodiment of the disclosure, the electronic device 500 may have a shape protruding from the first housing structure 510a by cutting the first portion 514 of the second housing structure 510b.

According to an embodiment of the disclosure, at least one camera mounting region 520 may be disposed to at least one edge among a plurality of edges provided in the housing 510. For instance, the camera mounting region 520 may be disposed to one edge of the housing 510 among four edges provided in the housing 510. For example, the camera mounting region 520 may be disposed to any one edge among an upper edge, lower edge, left edge, and right edge of the housing 510. It is exemplified in FIG. 5A to FIG. 5C that the camera mounting region 520 is disposed to a partial region of the second face 512a of the first housing structure. According to an embodiment of the disclosure, the camera mounting region 520 may extend along a second face (e.g., the second face 512a of FIG. 1C).

According to an embodiment of the disclosure, the camera mounting region 520 may protrude in a direction away from an edge of the second housing structure 510b, for example, in a fifth direction ⑤, and thus may be disposed not to overlap with the second housing structure 510b when folding the flexible display 502 provided in the housing 510. According to an embodiment of the disclosure, the camera mounting region 520 may include a first mounting face 520a facing the first direction ① and a second mounting face 520b facing the second direction ②. According to an embodiment of the disclosure, at least part of the first mounting face 520a of the camera mounting region 520 may be a display region, and at least part of the second mounting face 520b may be a flat face on which at least one camera is mounted. According to an embodiment of the disclosure, the camera 521 may be arranged in at least a partial region of the second mounting face 520b.

According to an embodiment of the disclosure, when the electronic device 500 is folded in the out-folding manner, the camera mounting region 520 may not overlap with the second housing structure 510b. According to an embodiment of the disclosure, when the electronic device 500 is folded, the camera mounting region 520 is open, thereby operating the camera 521 arranged on the second mounting face 520b of the camera mounting region 520.

According to an embodiment of the disclosure, the camera 521 mounted to the second mounting face 520b of the camera mounting region 520 may operate as a front camera or a rear camera depending on a folding state of the electronic device 500.

According to an embodiment of the disclosure, in the camera mounting region 520, at least one optical sensor 522 may be disposed adjacent to the camera 521. According to an embodiment of the disclosure, in the camera mounting region 520, the at least one optical sensor 522 may be disposed to the second mounting region 520b. For example, the at least one optical sensor 522 may further include at least one of a gesture sensor, a gyro sensor, a barometric pressure sensor, a magnetic sensor, an acceleration sensor, a grip sensor, a color sensor, an InfraRed (IR) sensor, a biological sensor, a temperature sensor, a humidity sensor, and an illuminance sensor. According to an embodiment of the disclosure, at least one sensor 522 may be coplanar with the camera 521.

According to an embodiment of the disclosure, the second housing structure 510b may have the first portion 514 constructed at part of an edge of the second side member 513b. According to an embodiment of the disclosure, in a state where the electronic device 500 is folded, the camera mounting region 520 may be open by the first portion 514, thereby optically operating camera 521.

Figure 6A:
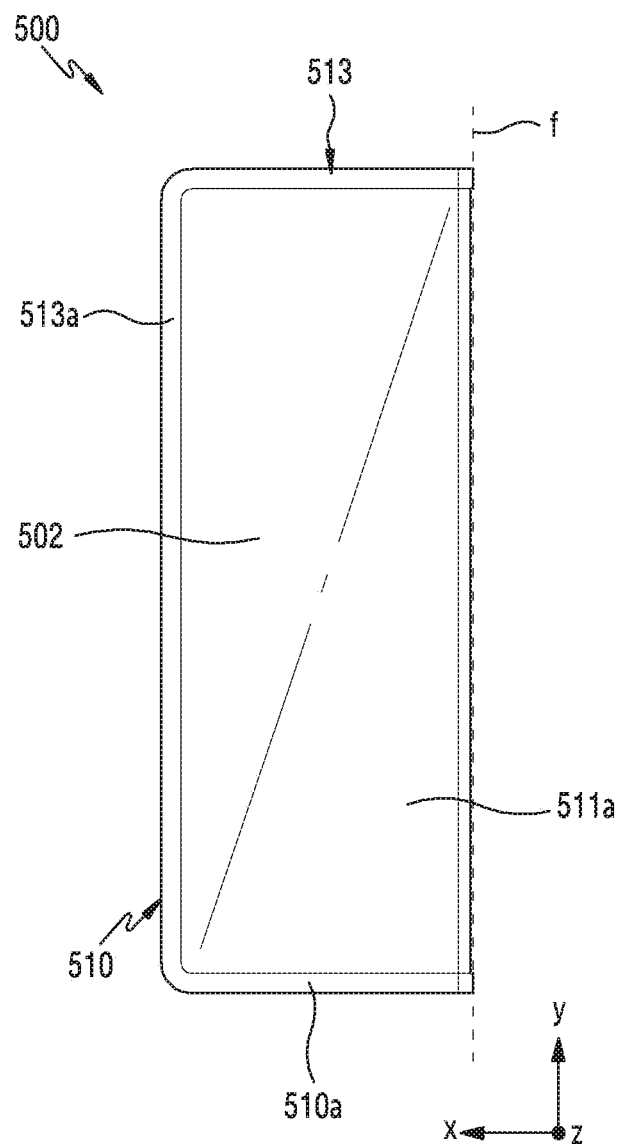
FIG. 6A is a top view illustrating an electronic device of a folded state according to an embodiment of the disclosure.
Figure 6B:
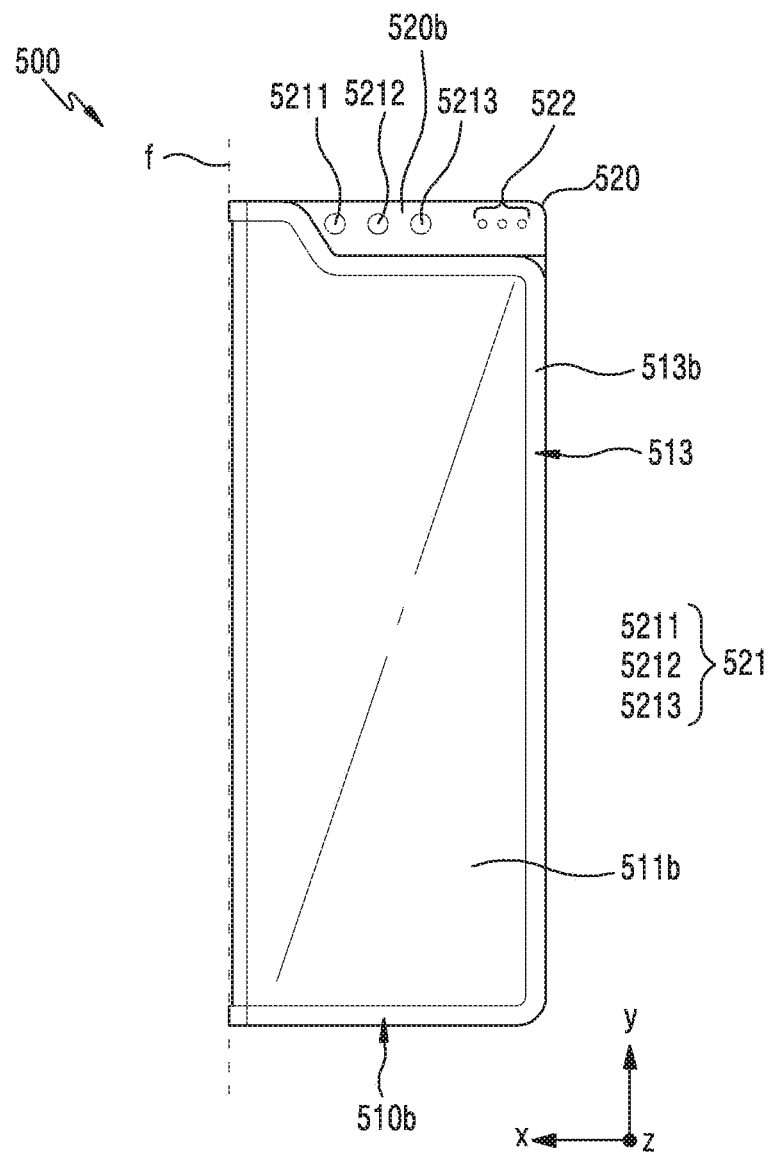
FIG. 6B is a bottom view illustrating an electronic device of a folded state according to an embodiment of the disclosure.

FIG. 6A is a top view illustrating an electronic device of a folded state according to an embodiment of the disclosure. FIG. 6B is a bottom view illustrating an electronic device of a folded state according to an embodiment of the disclosure.

Referring to FIGS. 6A and 6B, in a state where the electronic device 500 according to an embodiment is folded, second and fourth faces (e.g., second and fourth faces 512a and 512b of FIG. 5C) of a second plate may face or in contact with each other, and the first and third faces 511a and 511b of the first plate 511 may be exposed to the outside. According to an embodiment of the disclosure, the first housing structure 510a may face the second housing structure 510b and may be stacked with each other. According to an embodiment of the disclosure, the first side member 513a may face the second side member 513b, and may be stacked with each other. According to an embodiment of the disclosure, the camera mounting region 520 may be adjacent to a portion of the edge of the second side member 513b. For example, the electronic device 500 of FIG. 6A may use the camera 521 as a rear camera, and the electronic device 500 of FIG. 6B may use the camera 521 as a front camera.

Figure 7A:
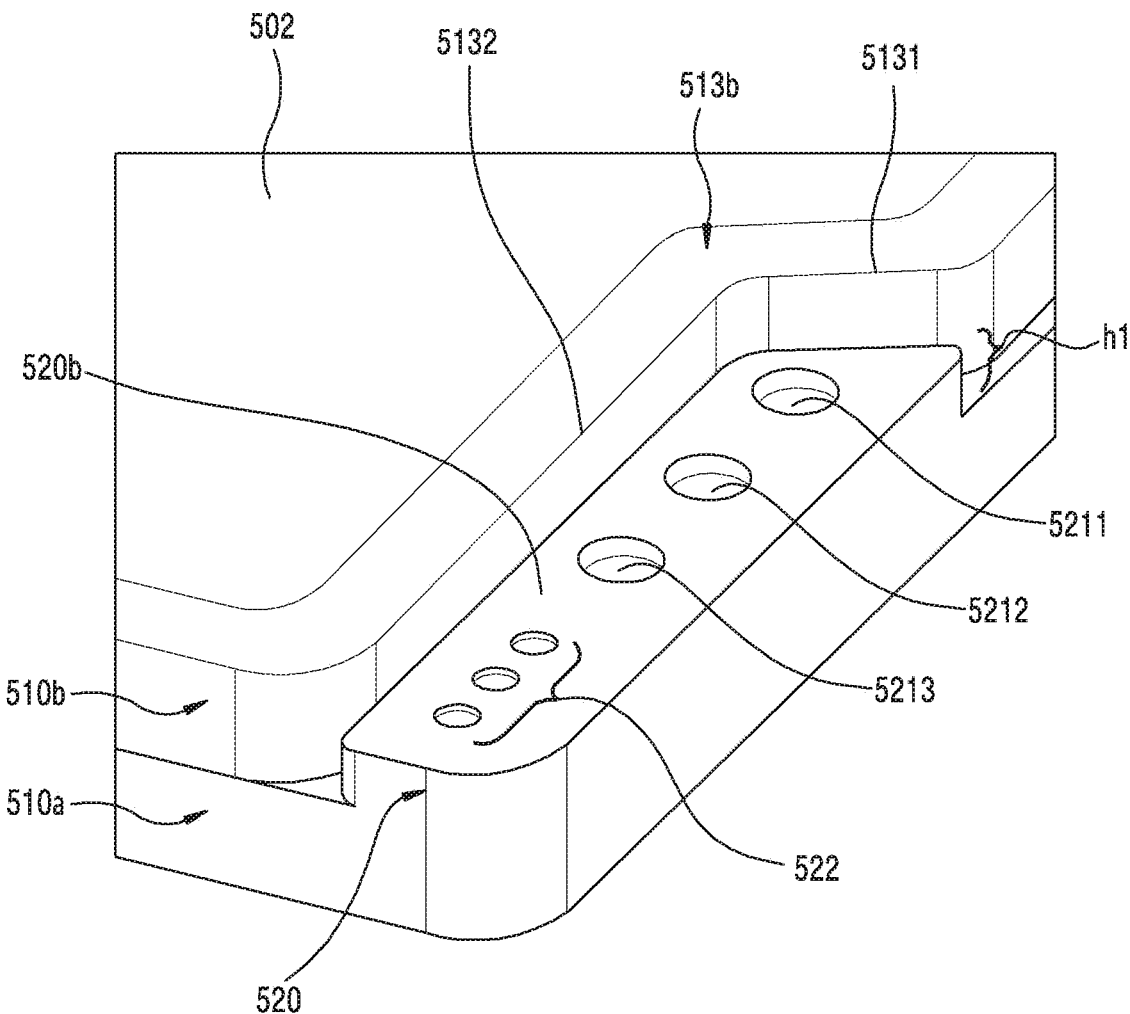
FIG. 7A is a perspective view illustrating at least one camera disposed to a camera mounting region according to an embodiment of the disclosure.
Figure 7B:
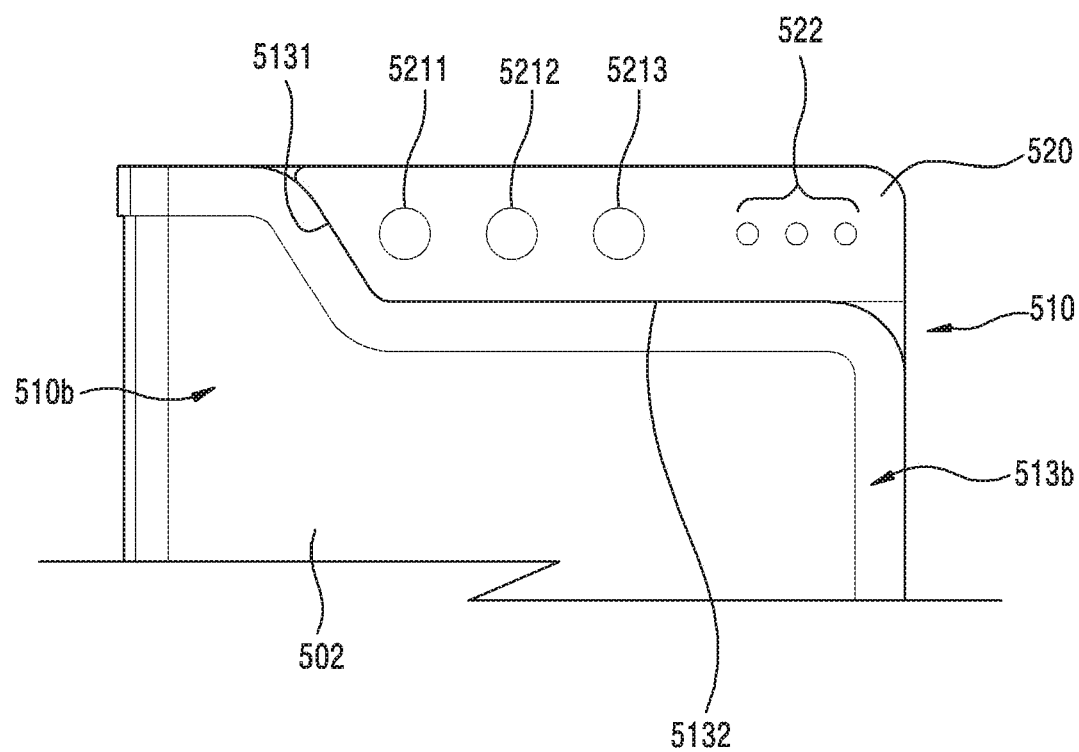
FIG. 7B is a top view of FIG. 7A according to an embodiment of the disclosure.
Figure 7C:
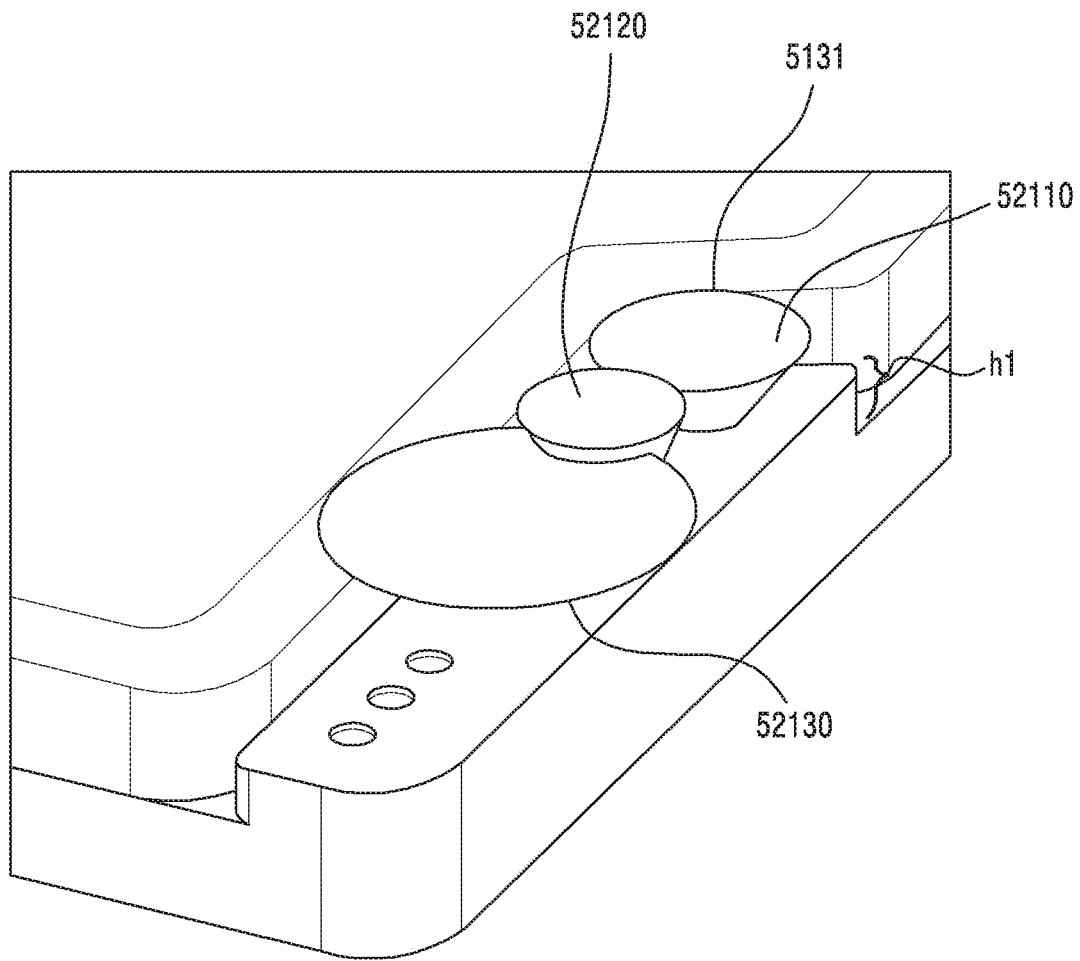
FIG. 7C is a stereoscopic diagram illustrating a viewing angle of at least one camera disposed to a camera mounting region according to an embodiment of the disclosure.

FIG. 7A is a perspective view illustrating at least one camera disposed to a camera mounting region according to an embodiment of the disclosure. FIG. 7B is a top view of FIG. 7A according to an embodiment of the disclosure. FIG. 7C is a stereoscopic diagram illustrating a viewing angle of at least one camera disposed to a camera mounting region according to an embodiment of the disclosure.

Referring to FIGS. 7A to 7C, when the electronic device 500 according to an embodiment is folded in an out-folding manner, at least one or more cameras 5211, 5212, and 5213 and the at least one optical sensor 522 may be open in the second direction ②. According to an embodiment of the disclosure, when the electronic device 500 is in a folded state, the at least one or more cameras 5211, 5212, and 5213 may be disposed adjacent to edges, i.e., a first edge portion 5131 and a second edge portion 5132, of the second side member 513b adjacent to a first portion (e.g., the first portion 514 of FIG. 5A). According to an embodiment of the disclosure, the second edge portion 5132 may be longer than the first edge portion 5131.

According to an embodiment of the disclosure, the camera mounting region 520 may protrude from a second face (e.g., the second face 512a of FIG. 5C) with a specific height h1, and the at least one or more cameras 5211, 5212, and 5213 and the at least one optical sensor 522 may be disposed to the second face with a predetermined height h1. Depending on this camera disposition structure, a viewing angle of the at least one or more cameras 5211, 5212, and 5213 may be enlarged. According to an embodiment of the disclosure, the protrusion height h1 of the camera mounting region may be less than or equal to a thickness of the housing, for example, a thickness of the second housing structure 510b.

According to an embodiment of the disclosure, the protrusion height h1 of the camera mounting region may be less than or equal to the thickness of the second side member 513b. With the increase in the protrusion height h1, the camera mounting region 520 may reduce obscureness of the viewing angle of the cameras 5211, 5212, and 5213 due to the second side member 513b.

According to an embodiment of the disclosure, the at least one or more cameras 5211, 5212, and 5213 may be coplanar with the at least one optical sensor 522. For example, the at least one or more cameras 5211, 5212, and 5213 and the at least one optical sensor 522 may be disposed to one face of the second plate 512 along a direction in which the second mounting face 520b of the camera mounting region 520 extends.

According to an embodiment of the disclosure, regarding the at least one or more cameras 5211, 5212, and 5213, when a camera closest to the first edge portion 5131 is the first camera 5211, a camera farthest from the first edge portion 5131 is the third camera 5213, and a camera disposed between the first and third cameras 5211 and 5213 is the second camera 5212, a viewing angle 52130 of the third camera 5213 may be the greatest, and a viewing angle 52120 of the second camera 5212 may be the smallest. As another example, the viewing angle 52120 of the second camera may be between viewing angles 52110 and 52130 of the first and third cameras. For example, the camera may include the first camera 5211 with a viewing angle of about 78 degrees at a first position, the second camera 5212 with a viewing angle of about 45 degrees at a second position, and the third camera 5213 with a viewing angle of about 120 degrees at a third position. The first camera 5211 may be a wide angle camera, the second camera 5212 may be a telephoto camera, or the third camera 5213 may be a super wide angle camera. As another example, the first camera 5211 may be a telephoto camera, the second camera 5212 may be a wide angle camera, or the third camera 5213 may be a super wide angle camera.

According to an embodiment of the disclosure, the first to third cameras 5211, 5212, and 5213 are not necessarily disposed as described above, and may be disposed variously.

Figure 8A:
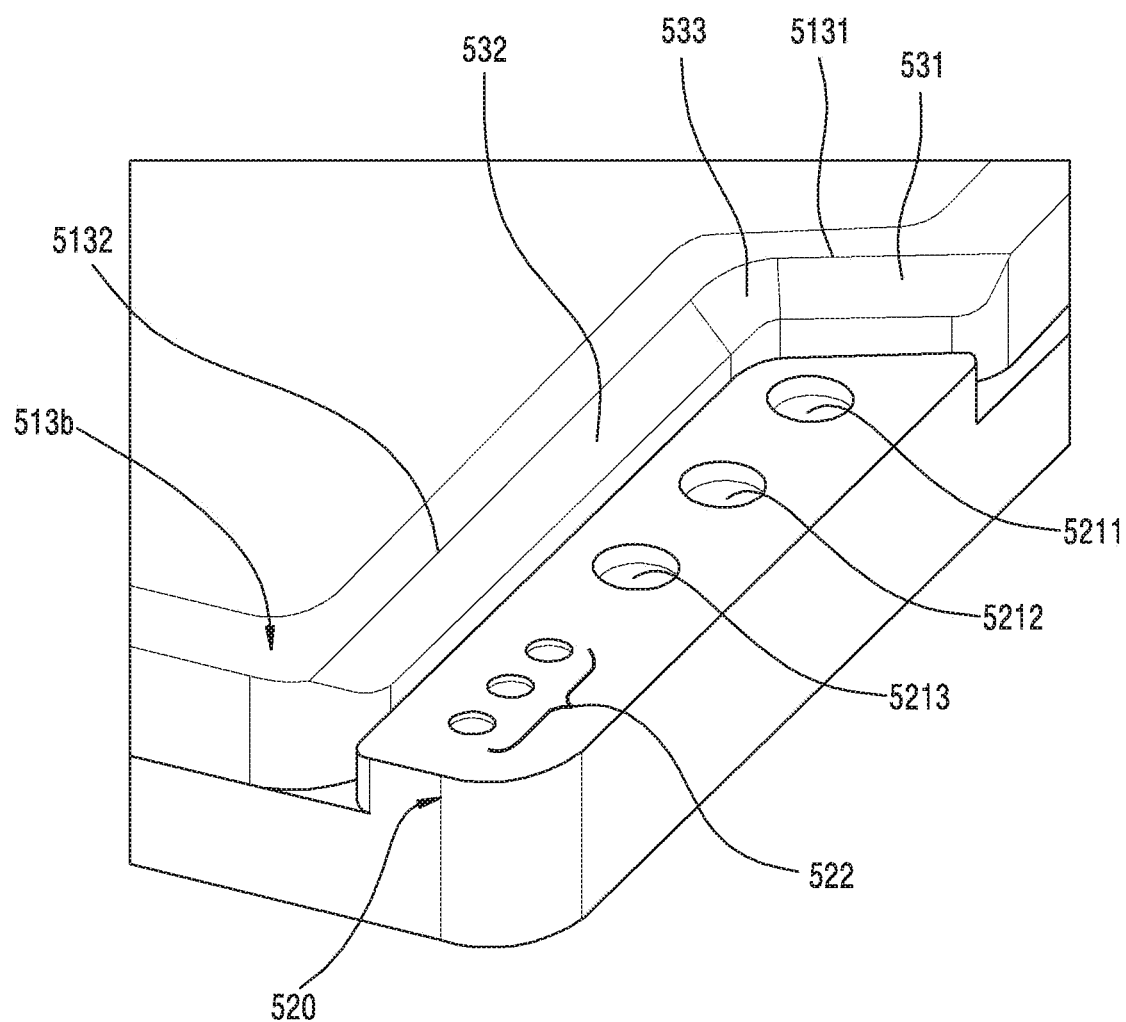
FIG. 8A is a perspective view illustrating a disposition state of at least one camera disposed to a camera mounting region according to an embodiment of the disclosure.
Figure 8B:
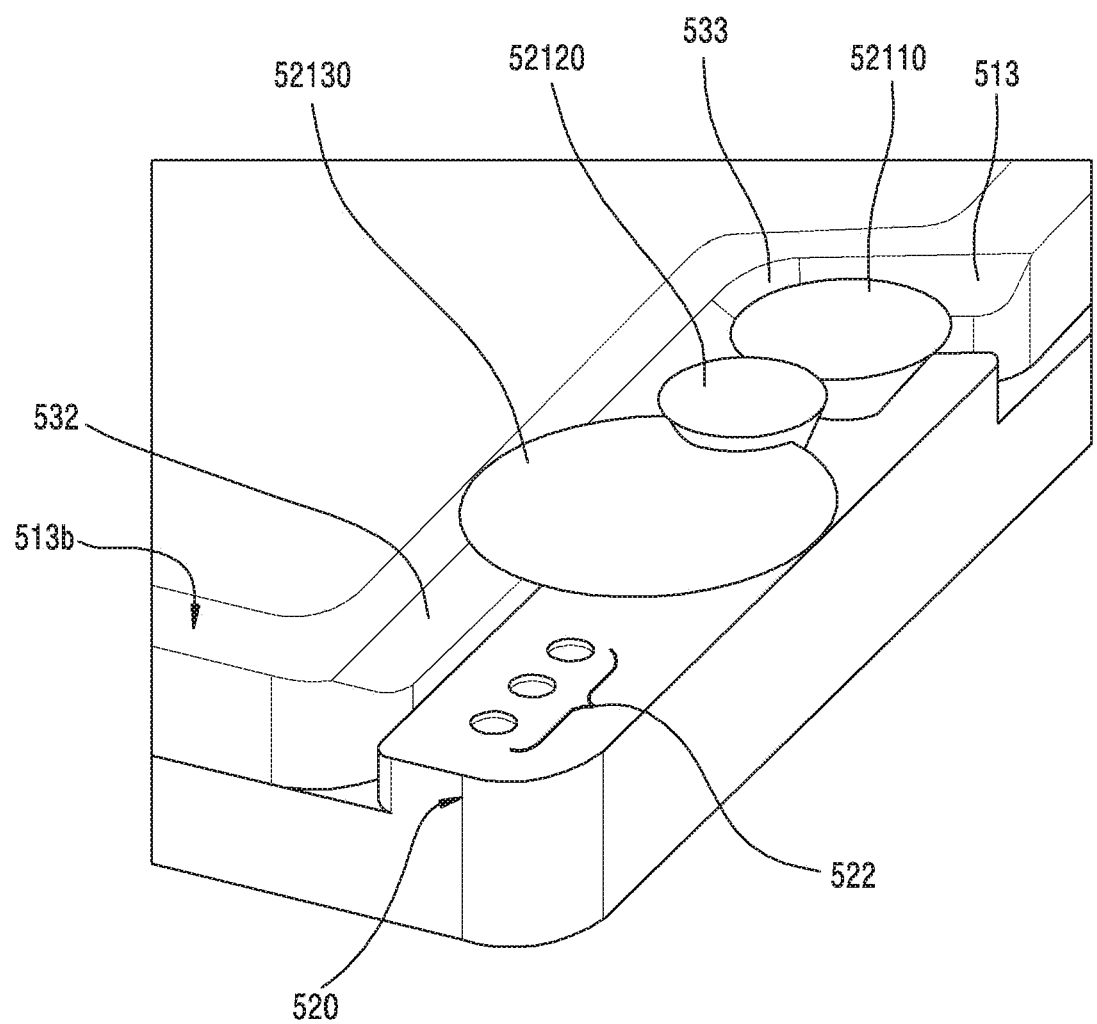
FIG. 8B is a stereoscopic diagram illustrating a state of a viewing angle of each camera disposed to a camera mounting region according to an embodiment of the disclosure.

FIG. 8A is a perspective view illustrating a disposition state of at least one camera disposed to a camera mounting region according to an embodiment of the disclosure. FIG. 8B is a stereoscopic diagram illustrating a state of a viewing angle of each camera disposed to a camera mounting region according to an embodiment of the disclosure.

Referring to FIGS. 8A and 8B, in the description of the second side member 513b of FIGS. 8A and 8B, detailed descriptions on the substantially same structure as the side member structure of FIGS. 7A and 7B will be omitted to avoid redundancy, and only a different structure will be described.

The second side member 513b of FIGS. 8A and 8B may have at least one or more faces 531, 532, and 533 constructed by cutting each of the first and second edge portions 5131 and 5132 adjacent to the camera mounting region. According to an embodiment of the disclosure, the at least one or more faces 531, 532, and 533 may be an inclined face. For example, the at least one or more faces 531, 532, and 533 may be an inclined flat face or an inclined curved face.

According to an embodiment of the disclosure, the at least one or more faces 531, 532, and 533 may include the first and second faces 531 and 532. According to an embodiment of the disclosure, the first and second faces 531 and 532 are inclined faces each of which is constructed by being cut in an inclined direction, and may be constructed to reduce obscureness of the respective viewing angles 52110, 52120, and 52130 of the first to third cameras 5211, 5212, and 5213 disposed to the camera mounting region 520. For example, the first face 531 may be a first inclined face, and the second face 532 may be a second inclined face. According to an embodiment of the disclosure, the first face 531 may be inclined with a first angle, and the second face 532 may be inclined with a second angle. The first and second angles may be the same or different. For example, the first and second faces 531 and 532 may be inclined with substantially the same angle.

According to an embodiment of the disclosure, the third face 533 may be constructed between the first and second faces 531 and 532. The third face 531 may be constructed by cutting between the first edge portion 5131 and the second edge portion 5132. According to an embodiment of the disclosure, the third face 533 is an inclined face, and may be a curved face.

According to an embodiment of the disclosure, the first to third faces 531, 532, and 533 may be constructed such that at least part of the side member 513 does not exist within the viewing angles 52110, 52120, and 52130 of the camera or is disposed out of the viewing angle. For example, the first to third faces 531, 532 and 533 may be constructed based on the viewing angle of each camera. For example, when the first to third cameras 5215, 5212, and 5213 are mounted to the camera mounting region 520, inclination angles of the first to third faces 531, 532, and 533 may be determined based on a camera having the greatest viewing angle. For example, if there is a wide angle camera having the greatest viewing angle among the mounted three cameras 5221, 5212, and 5213, an inclined face may be constructed based on the viewing angle of the wide angle camera.

According to an embodiment of the disclosure, the first camera 5211 may determine a distance from the first and second edge portions 5131 and 5132 based on a viewing angle. For example, the first camera 5211 may be disposed at a position where there is no interference of at least part of the second side member 513b in the viewing angle 52110 or at a position where the interference can be decreased. In an embodiment of the disclosure, when the interference exists in the viewing angle 52110 of the first camera 5211, the first and second faces 531 and 532 may be constructed at the first edge portion 5131 or second edge portion 5132 of the second side member 513b, based on the viewing angle of the first camera 5211.

Figure 9A:
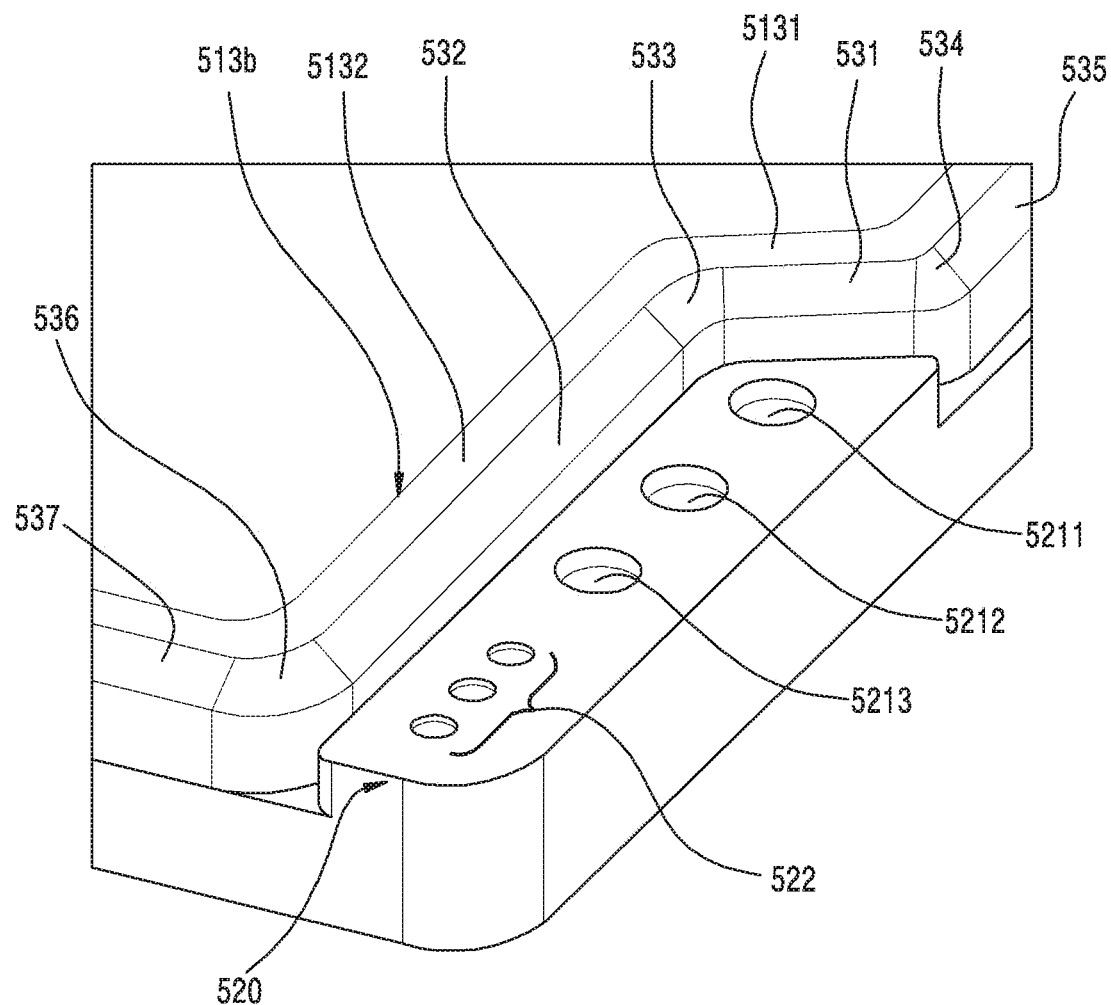
FIG. 9A is a perspective view illustrating a disposition state of at least one camera disposed to a camera mounting region according to an embodiment of the disclosure.
Figure 9B:
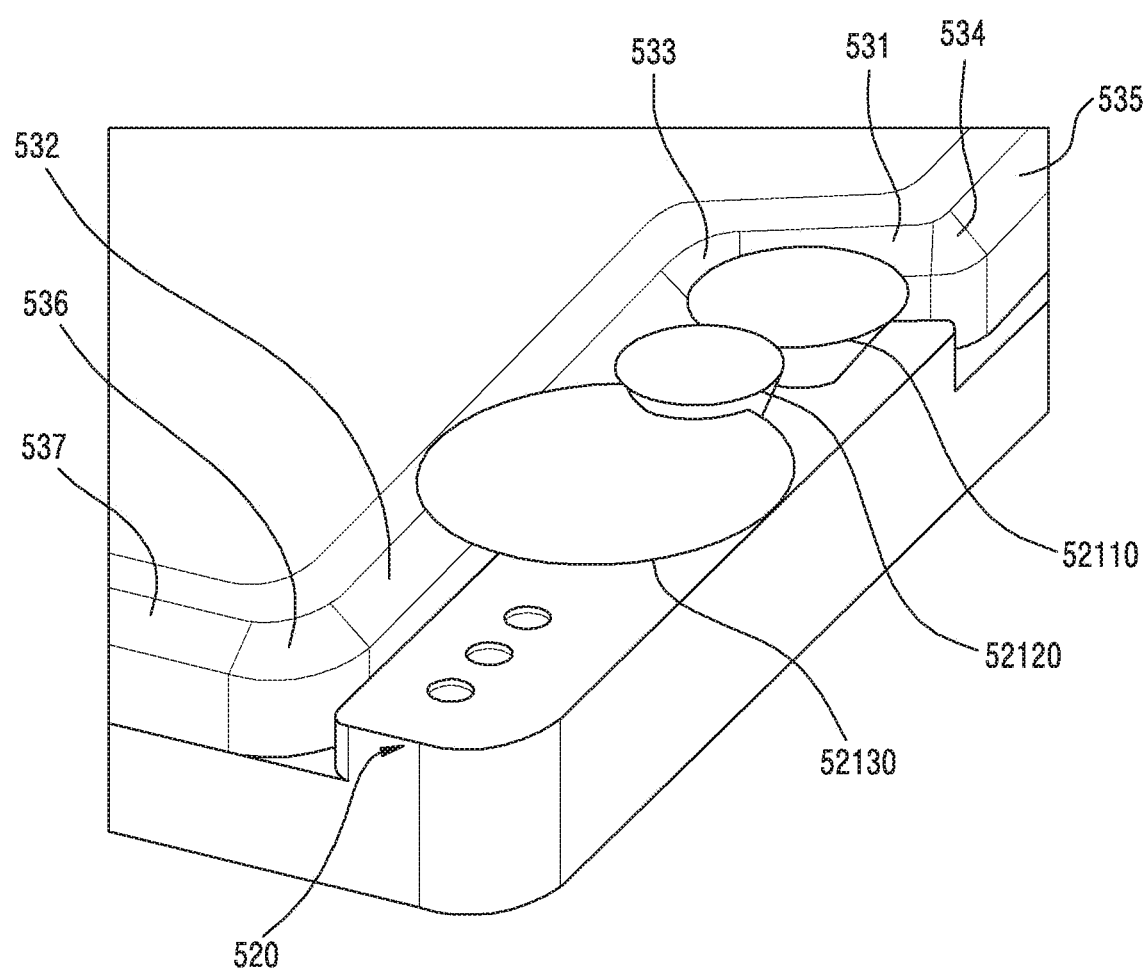
FIG. 9B is a stereoscopic diagram illustrating a state of a viewing angle of each camera disposed to a camera mounting region according to an embodiment of the disclosure.

FIG. 9A is a perspective view illustrating a disposition state of at least one camera disposed to a camera mounting region according to an embodiment of the disclosure. FIG. 9B is a stereoscopic diagram illustrating a state of a viewing angle of each camera disposed to a camera mounting region according to an embodiment of the disclosure.

Referring to FIGS. 9A and 9B, in the description of the second side member 513b of FIGS. 9A and 9B, detailed descriptions on the substantially same structure as the side member structure of FIGS. 8A and 8B will be omitted to avoid redundancy, and only a different structure will be described.

Although the second side member 513b of FIGS. 8A and 8B has a structure in which the first to third faces 531, 532, and 533 are constructed to be inclined by cutting only an edge portion adjacent to a first portion (e.g., the first portion 514 of FIG. 1A and FIG. 1B), the second side member 513b of FIGS. 9A and 9B may construct an inclined face by cutting an edge portion as a whole.

The second side member 513b according to an embodiment may have fourth and fifth faces 534 and 535 constructed in contact with the first face 531 and sixth and seventh faces 536 and 537 constructed in contact with the second face 532. According to an embodiment of the disclosure, the first face 535 may continuously extend, and the seventh face 537 may continuously extend. For example, each of the fourth and sixth faces 534 and 536 may be an inclined curved face, and each of the fifth and seventh faces 535 and 537 may be an inclined flat face.

According to an embodiment of the disclosure, the first to seventh faces 531 to 537 may be positioned not to overlap with the viewing angles 52110, 52120, and 52130 of the first to third cameras.

Figure 10A:
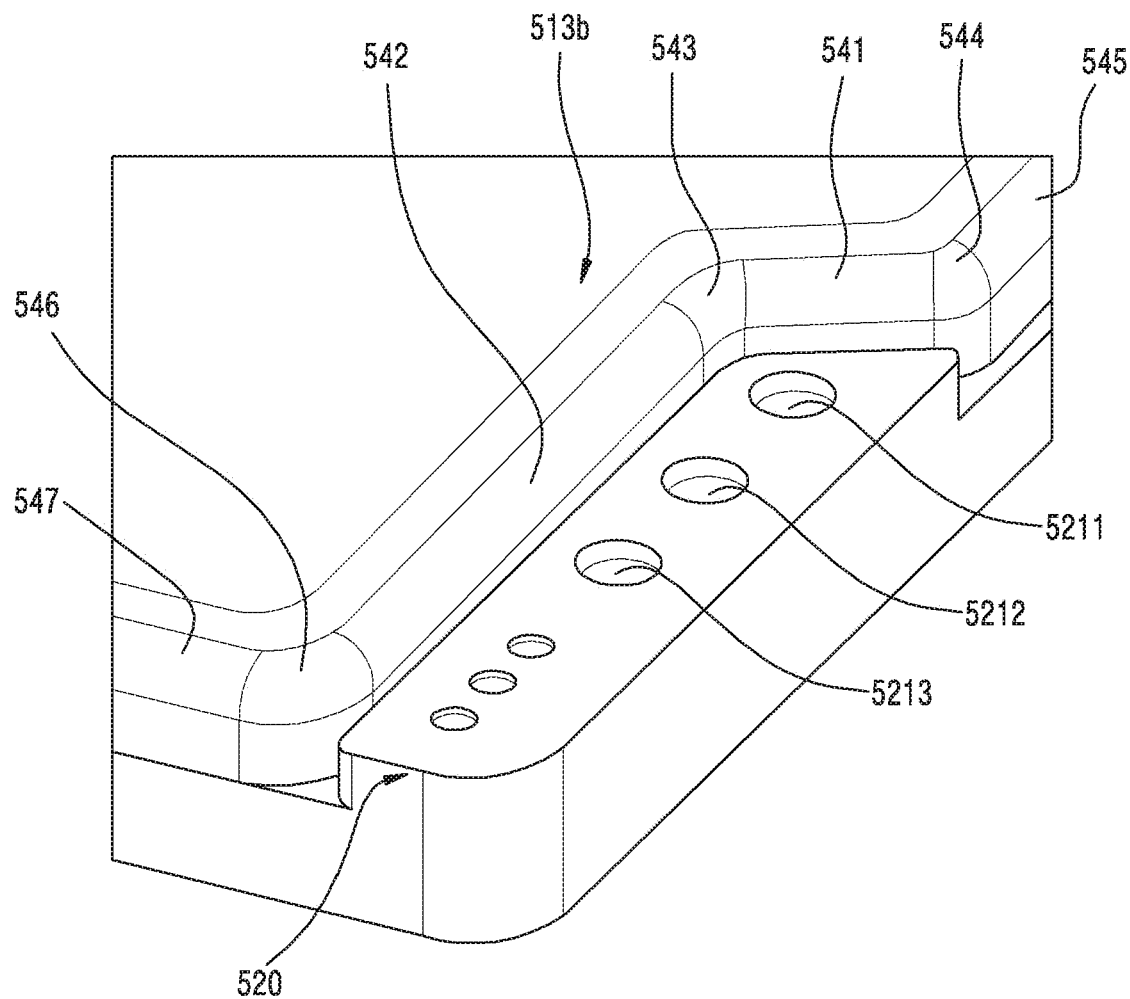
FIG. 10A is a perspective view illustrating a disposition state of at least one camera disposed to a camera mounting region according to an embodiment of the disclosure.
Figure 10B:
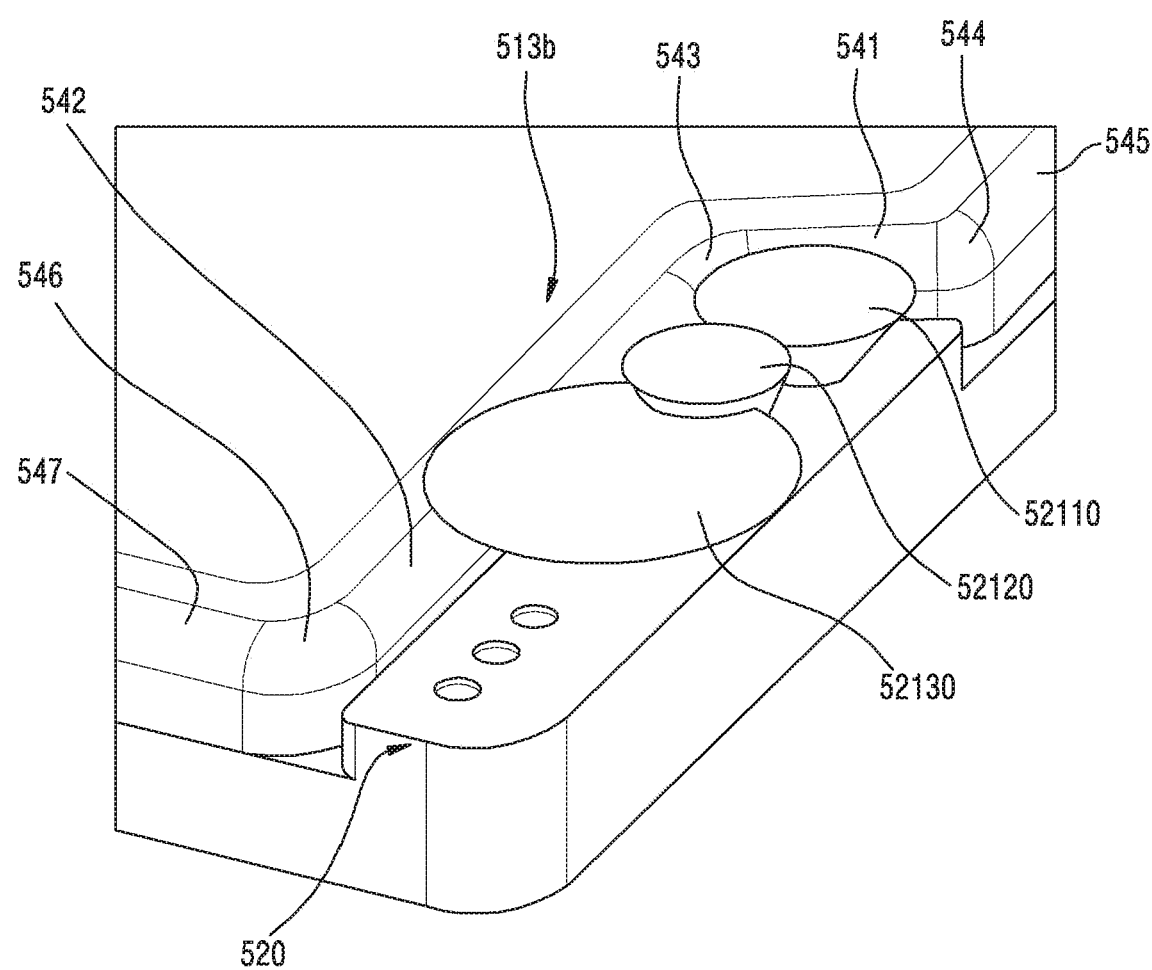
FIG. 10B is a stereoscopic diagram illustrating a state of a viewing angle of each camera disposed to a camera mounting region according to an embodiment of the disclosure.

FIG. 10A is a perspective view illustrating a disposition state of at least one camera disposed to a camera mounting region according to an embodiment of the disclosure. FIG. 10B is a stereoscopic diagram illustrating a state of a viewing angle of each camera disposed to a camera mounting region according to an embodiment of the disclosure.

Referring to FIGS. 10A and 10B, in the description of the second side member 513b of FIG. 10A and FIG. 10B, detailed descriptions on the substantially same structure as the second side member structure of FIGS. 9A and 9B will be omitted to avoid redundancy, and only a different structure will be described.

Although the second side member of FIGS. 9A and 9B has the first to seventh faces 531 and 537 of which cut portions are constructed of a flat face and a curved face, the second side face 513b of FIGS. 10A and 10B may have first to seventh faces 541 to 547 of which cut edge portions are constructed of curved faces as a whole. For example, the first to seventh faces 541 to 547 may be curved faces which are convex toward the first to third cameras 5215, 5212, and 5213. The curved face may have a curvature. According to an embodiment of the disclosure, the first to seventh faces 541 to 547 may be positioned not to overlap with the respective viewing angles 52110, 52120, and 52130 of the first to third cameras.

Figure 11A:
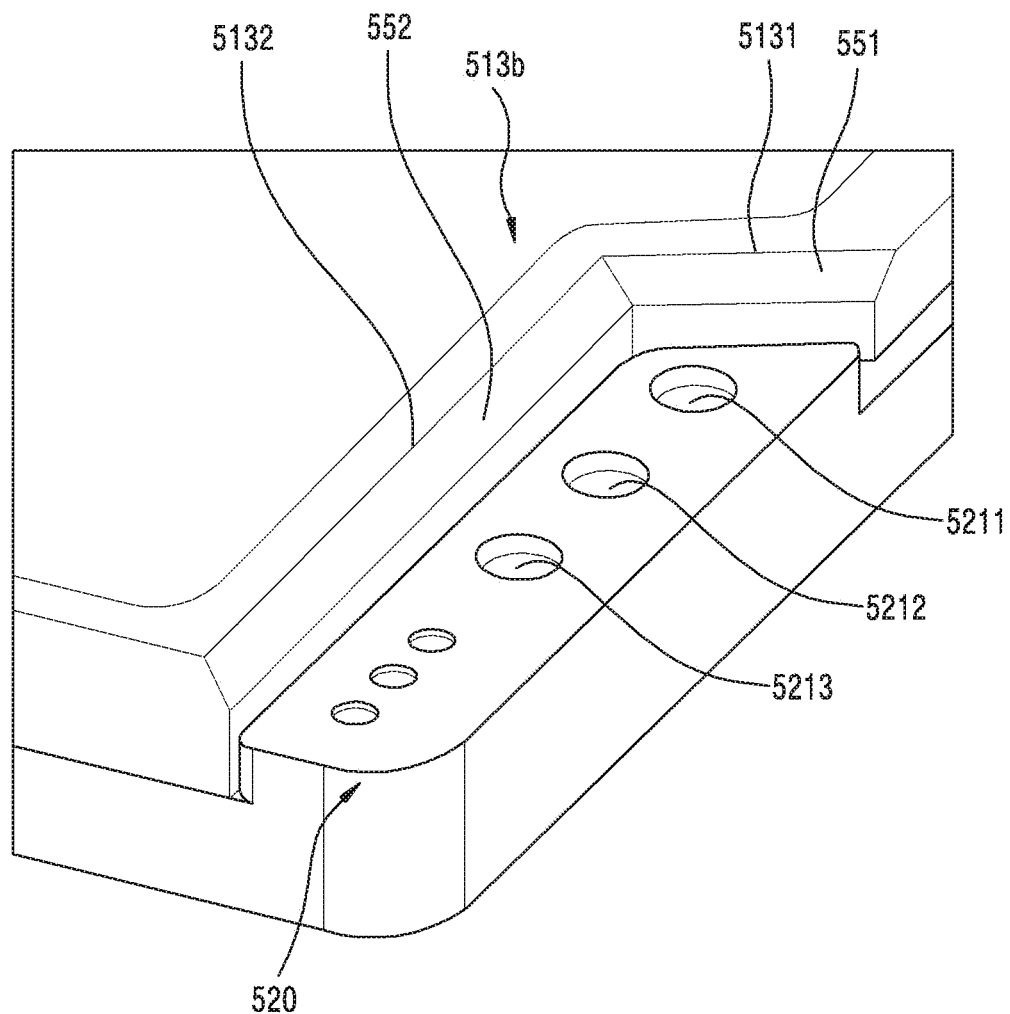
FIG. 11A is a perspective view illustrating a disposition state of at least one camera disposed to a camera mounting region according to an embodiment of the disclosure.
Figure 11B:
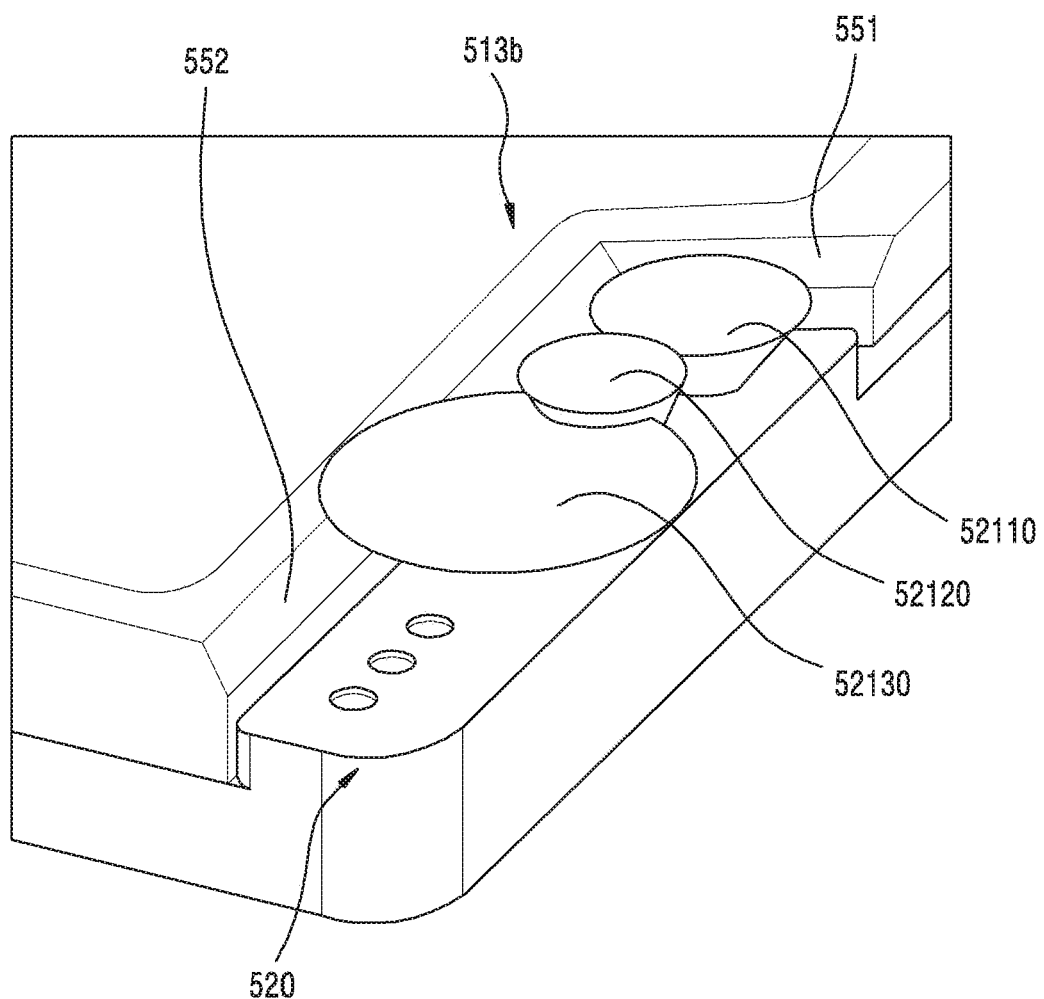
FIG. 11B is a stereoscopic diagram illustrating a state of a viewing angle of each camera disposed to a camera mounting region according to an embodiment of the disclosure.

FIG. 11A is a perspective view illustrating a disposition state of at least one camera disposed to a camera mounting region according to an embodiment of the disclosure. FIG. 11B is a stereoscopic diagram illustrating a state of a viewing angle of each camera disposed to a camera mounting region according to an embodiment of the disclosure.

Referring to FIGS. 11A and 11B, in the description of the second side member 513b of FIGS. 11A and 11B, detailed descriptions on the substantially same structure as the side member structure of FIGS. 8A and 8B will be omitted to avoid redundancy, and only a different structure will be described.

The second side member 513b of FIGS. 11A and 11B may have first and second faces 551 and 552 constructed by cutting the first and second edge portions 5131 and 5132 as flat inclined faces. The first face 551 may extend along the first edge portion 5131, and the second face 552 may extend along the second edge portion 5132.

According to an embodiment of the disclosure, the first and second faces 551 and 552 may be positioned not to overlap with the respective viewing angles 52110, 52120, and 52130 of the first to third cameras.

Figure 12A:
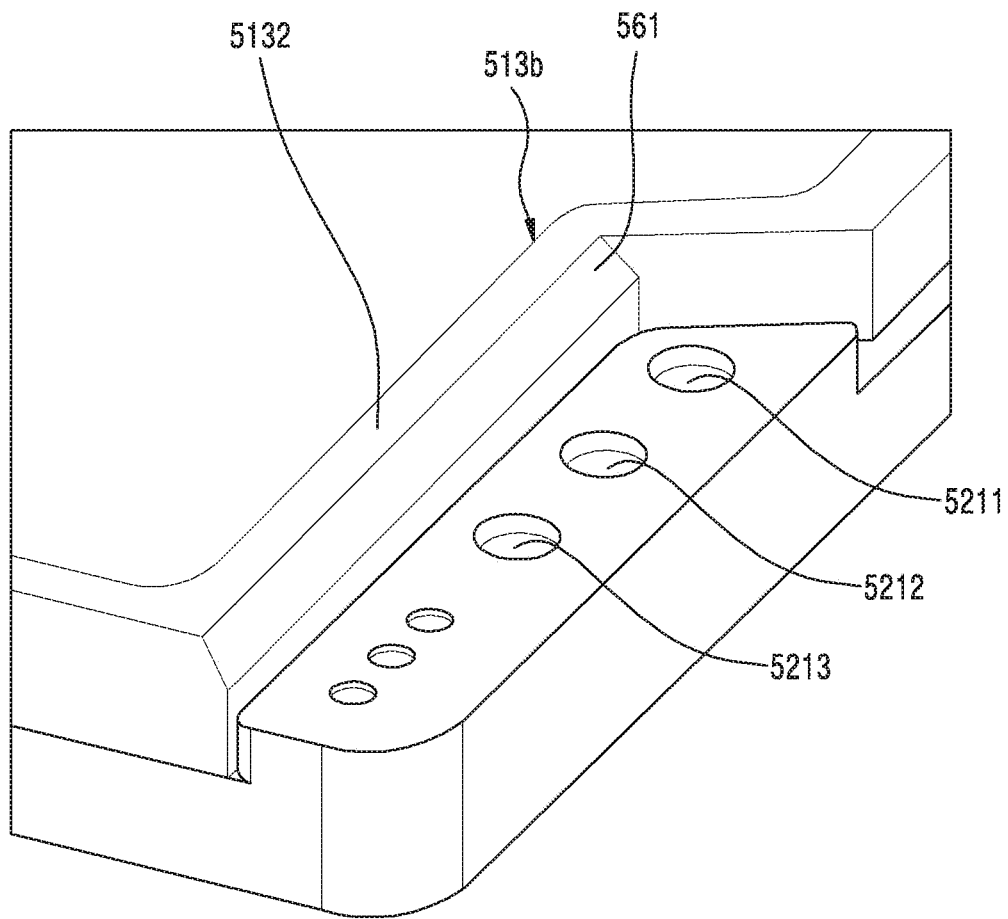
FIG. 12A is a perspective view illustrating a disposition state of at least one camera disposed to a camera mounting region according to an embodiment of the disclosure.
Figure 12B:
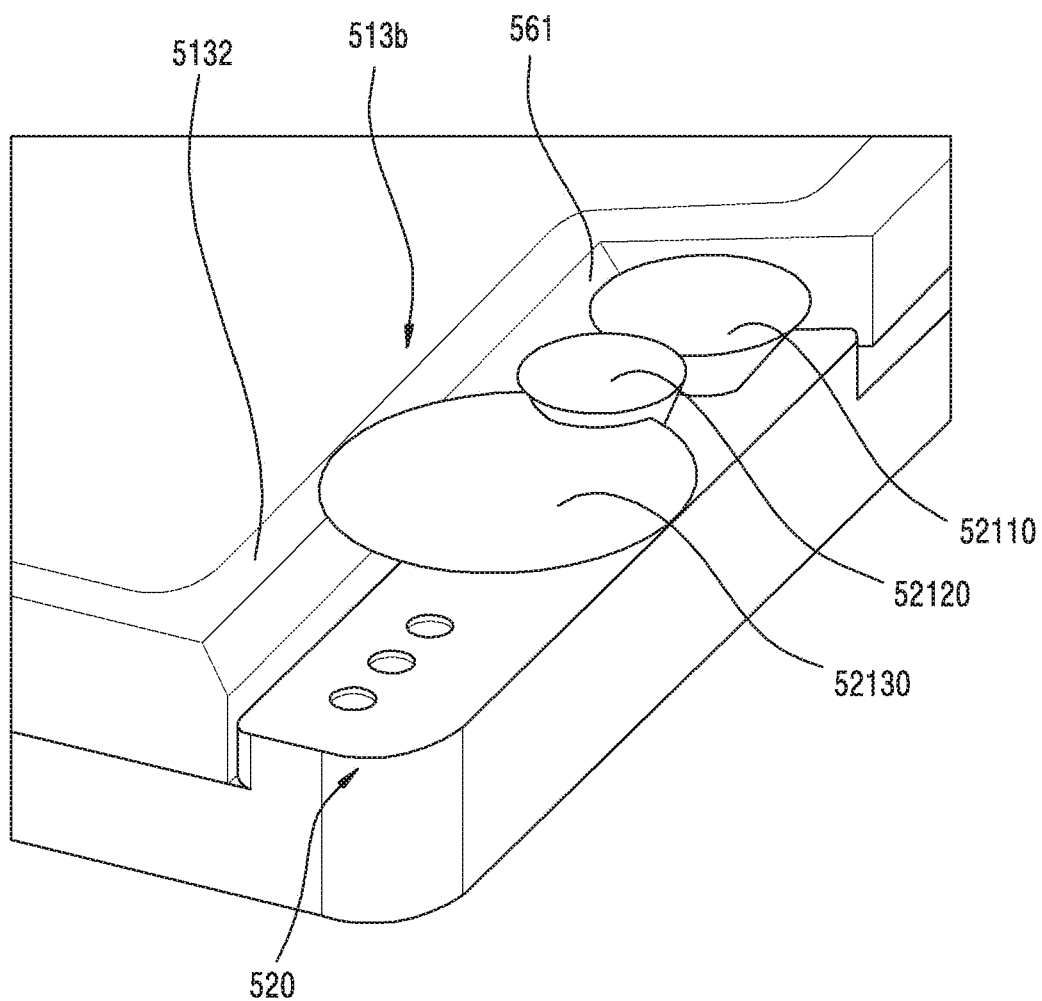
FIG. 12B is a stereoscopic diagram illustrating a state of a viewing angle of each camera disposed to a camera mounting region according to an embodiment of the disclosure.

FIG. 12A is a perspective view illustrating a disposition state of at least one camera disposed to a camera mounting region according to an embodiment of the disclosure. FIG. 12B is a stereoscopic diagram illustrating a state of a viewing angle of each camera disposed to a camera mounting region according to an embodiment of the disclosure.

Referring to FIGS. 12A and 12B, in the description of the second side member of FIGS. 12A and 12B, detailed descriptions on the substantially same structure as the side member structure of FIGS. 11A and 11B will be omitted to avoid redundancy, and only a different structure will be described.

The second side member 513b of FIGS. 12A and 12B may have a first face 561 constructed by cutting the first edge portion 5131 as a flat inclined face. According to an embodiment of the disclosure, the first face 561 may extend along the first edge portion 5131. According to an embodiment of the disclosure, the first face 561 may be positioned not to overlap with the viewing angles 52110, 52120, and 52130 of first to third cameras 5211, 5212, and 5213.

Figure 13:
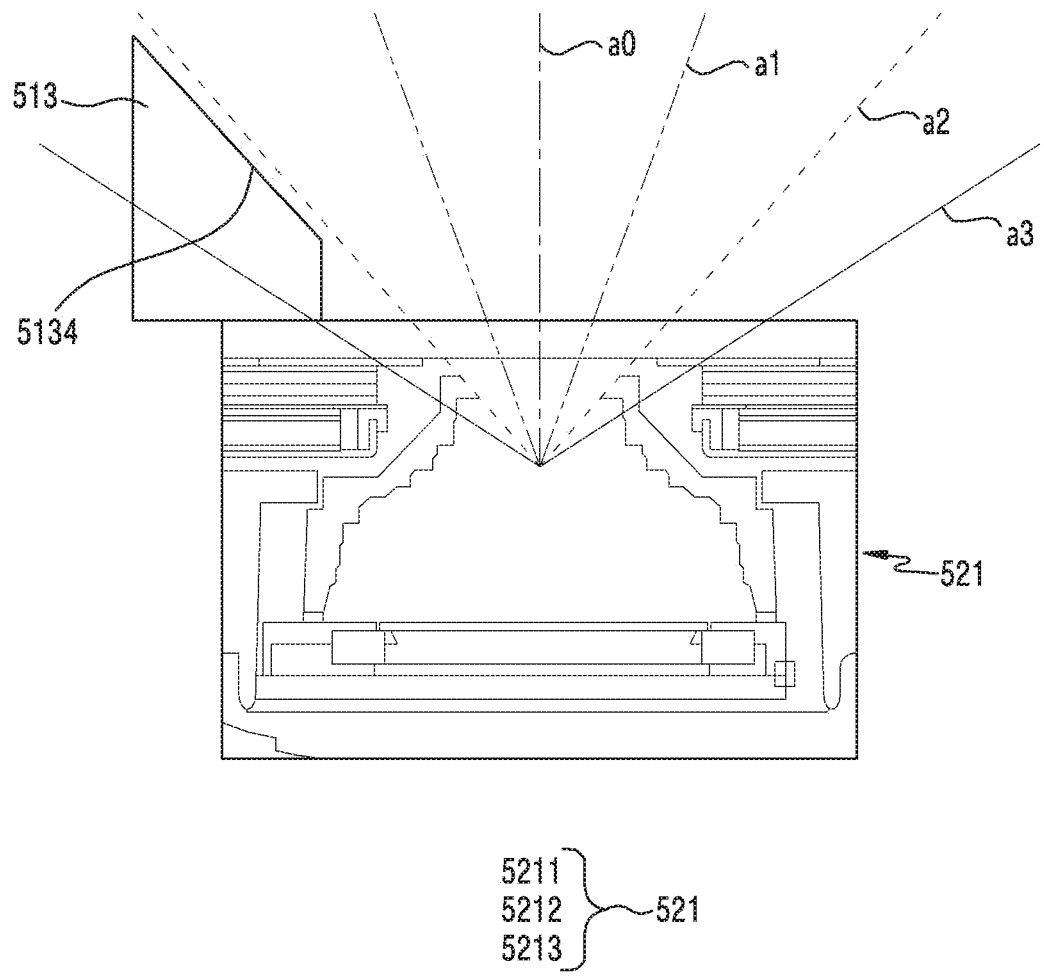
FIG. 13 is a view schematically illustrating various viewing angles of a camera according to an embodiment of the disclosure.

FIG. 13 is a view schematically illustrating various viewing angles of a camera according to an embodiment of the disclosure.

Referring to FIG. 13, the camera 521 (e.g., the cameras 5211, 5212, and 5213 of FIG. 8A) mounted to a camera mounting region (e.g., the camera mounting region 520 of FIG. 8A) may have different viewing angles, and may be disposed variously. According to an embodiment of the disclosure, when the camera 521 (e.g., the cameras 5211, 5212, and 5213 of FIG. 8A) has a first viewing angle a1 about an optical axis a1, for example, a telephoto viewing angle, or has a second viewing angle a2, for example, a first wide angle, the second side member 513b may have an inclined face constructed thereon so that there is no interference in the first viewing angle a1 or the second viewing angle a2. In an embodiment of the disclosure, a degree of inclination of the inclined face (e.g., the first and second inclined faces 531 and 532 of FIG. 8A) may be determined according to a camera having a greatest viewing angle among a plurality of cameras (e.g., the camera 5211, 5212, and 5213 of FIG. 8A) disposed to the camera mounting region 520. For example, an inclined face 5134 constructed on the side member 513 (e.g., the second side member 513b of FIG. 8A) may be constructed based on the viewing angle of the camera having the greatest viewing angle. In FIG. 13, the inclined face 5134 may be constructed based on a third viewing angle a3. According to an embodiment of the disclosure, the inclined face 5134 may be constructed to be positioned out of the third viewing angle.

Figure 14A:
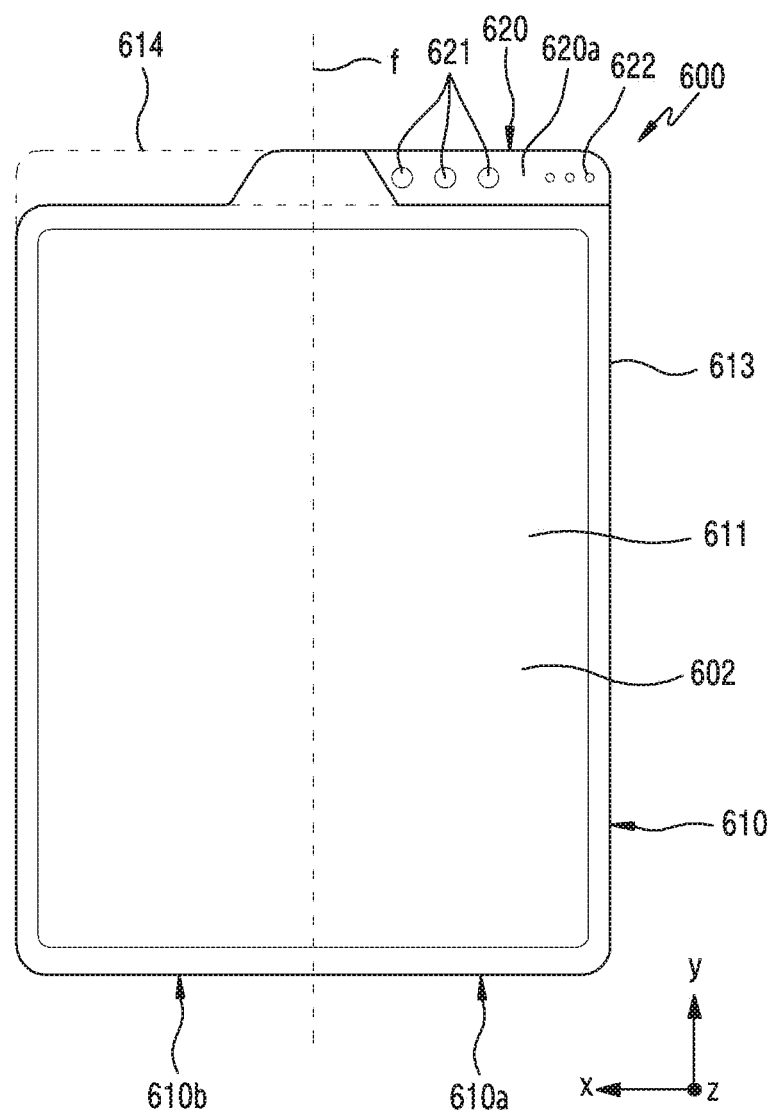
FIG. 14A is a top view illustrating an electronic device of an unfolded state according to an embodiment of the disclosure.
Figure 14B:
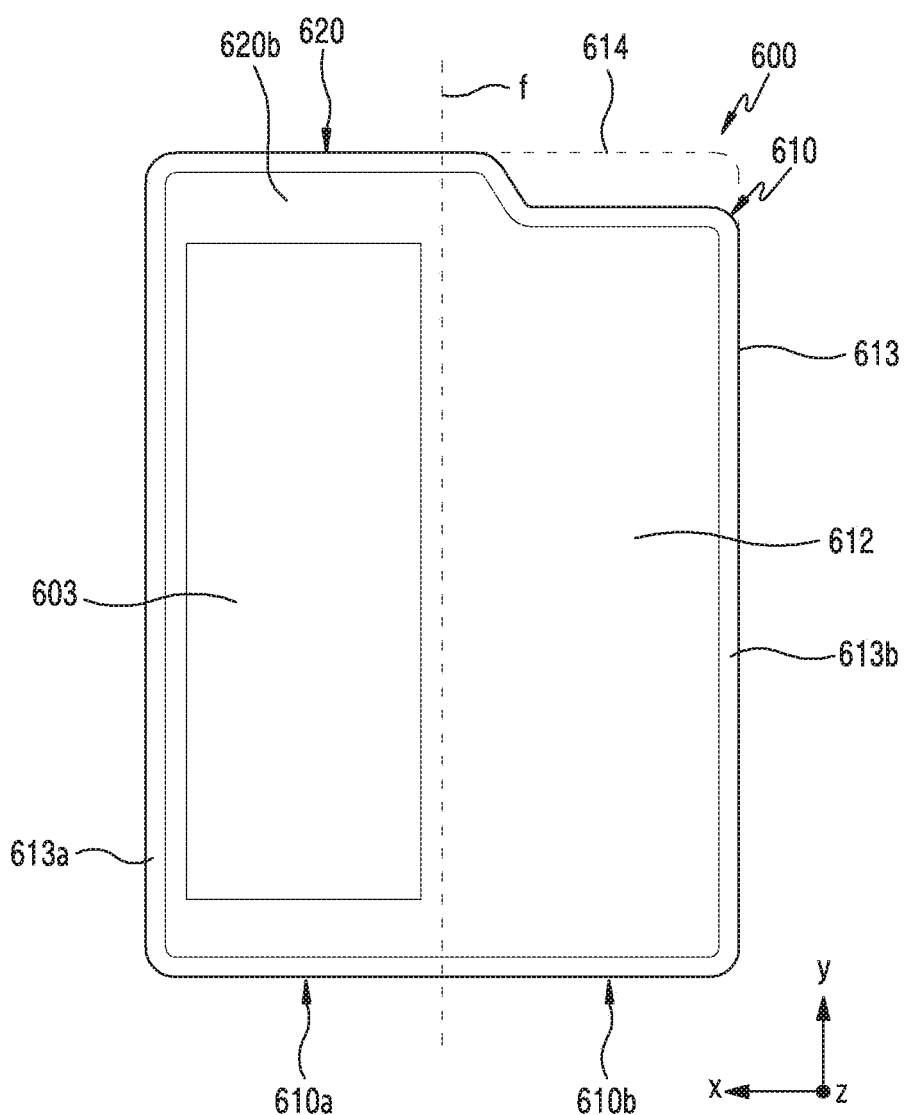
FIG. 14B is a bottom view illustrating an electronic device of an unfolded state according to an embodiment of the disclosure.
Figure 14C:
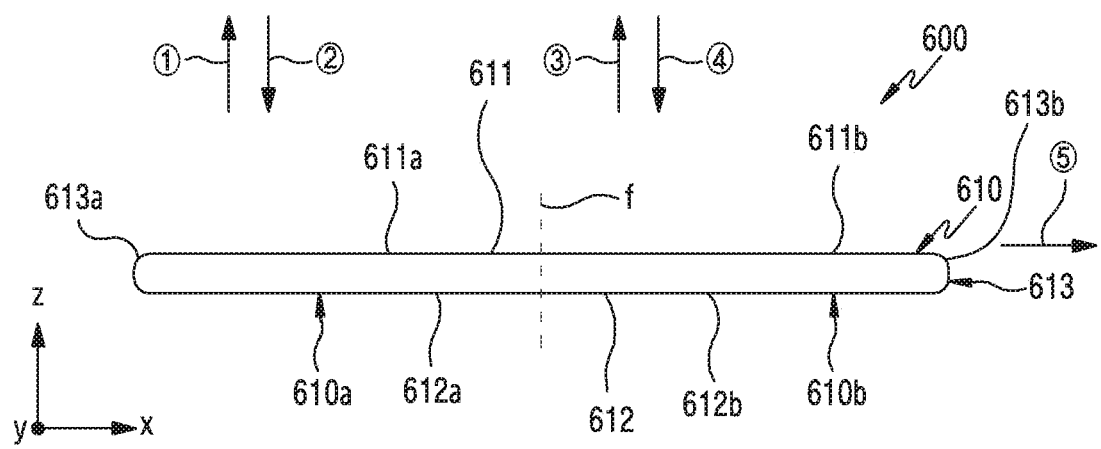
FIG. 14C is a side view illustrating an electronic device of an unfolded state according to an embodiment of the disclosure.

FIG. 14A is a top view illustrating an electronic device of an unfolded state according to an embodiment of the disclosure. FIG. 14B is a bottom view illustrating an electronic device of an unfolded state according to an embodiment of the disclosure. FIG. 14C is a side view illustrating an electronic device of an unfolded state according to an embodiment of the disclosure.

Referring to FIGS. 14A to 14C, an electronic device 600 (e.g., the electronic device 101 of FIG. 1 or the electronic device 20 of FIG. 2) according to an embodiment may include a housing 610 (e.g., the housing 200 of FIG. 2) capable of protecting a plurality of electronic components and constructing an exterior.

According to an embodiment of the disclosure, the housing 610 may include a first housing structure 610a and a second housing structure 610b. According to an embodiment of the disclosure, the first and second housing structures 610a and 610b may be coupled by a hinge structure or a folding structure. According to an embodiment of the disclosure, the second housing structure 610b may be folded on the first housing structure 610a or unfolded from the first housing structure 610b by the hinge structure or the folding structure.

According to an embodiment of the disclosure, the housing 610 may include a first plate 611, a second plate 612 opposite to the first plate 611, a second plate 612, and a side member 613 surrounding at least part of a space between the first and second plates 611 and 612.

According to an embodiment of the disclosure, the first plate 611 may be constructed of a polymer plate or glass plate including various coating layers.

According to an embodiment of the disclosure, the second plate 612 may be constructed of a substantially transparent, translucent, or opaque material. The second plate 612 may be constructed by, for example, coated or colored glass, ceramic, polymer, metal (e.g., aluminum, stainless steel (STS), or magnesium), or a combination of at least two of the above materials.

According to an embodiment of the disclosure, the side member 613 may be coupled with the first plate 611, and may be constructed by a side bezel structure including metal and/or polymer. In some embodiments of the disclosure, the second plate 612 and the side member 613 may be constructed integrally, and may include the same material (e.g., a metal material, such as aluminum).

According to an embodiment of the disclosure, the first plate 611 may include first and third faces 611a and 611b, the second plate 612 may include second and fourth faces 612a and 612b, and the side member 613 may include first and second side members 612a and 613b. According to an embodiment of the disclosure, the third face 611b may extend from the first face 611a. The fourth face 612b may extend from the second face 612a. The second side member 613b may extend from the first side member 613a. For example, the first and third faces 611a and 611b may be one face. The second and fourth faces 612a and 612b may be one face. The first and second side members 613a and 613b may be one member.

According to an embodiment of the disclosure, the first plate 611 may include a first face 611a included in the first housing structure 610a facing a first direction ①and a third face 611b included in the second housing structure 610b facing a third direction ③. The second plate 612 may include a second face 612a included in the first housing structure 610a facing a second direction ②and a fourth face 612b included in the second housing structure 610b facing a fourth direction ④ opposite to the third direction ③. According to an embodiment of the disclosure, at least part of the first plate 611 may be a display region, and the second plate 612 may be a back cover. For example, the side member 613 may be constructed of a metal material in a segmented form (e.g., in a state where a metal portion is spaced apart by a non-metal portion), and thus may serve as an antenna radiator. As the second plate 612, a second display or an auxiliary display may be disposed.

According to an embodiment of the disclosure, in the folded state, the first face 611a may face the third face 611b. In the unfolded state, the third direction ③ may be the same direction as the first direction ①.

According to an embodiment of the disclosure, the first side member 613a may be constructed in a shape surrounding at least part of a space between the first face 611a and the second face 611b, and the second side member 613b may be constructed in a shape surrounding at least part of a space between the third face 612a and the fourth face 612b.

According to an embodiment of the disclosure, the electronic device 600 may include a flexible display 602 disposed on at least part of the first plate 611. The flexible display 602 may be folded or unfolded along a folding line f. A folding manner may include an in-folding manner in which folding is achieved such that the display region is not visible to the outside. For example, the flexible display 602 may be disposed adjacent to or combined with a touch sensing circuit, a pressure sensor capable of measuring intensity (pressure) of the touch, and/or a digitizer detecting a stylus pen of a magnetic field type. According to an embodiment of the disclosure, the flexible display 602 may extend from the first face 611a to the third face 611b.

According to an embodiment of the disclosure, the electronic device 600 may include a rigid display 603 disposed to at least a partial region of the second plate 611. The rigid display 603 may be disposed to the second face 612a.

According to an embodiment of the disclosure, the housing 610 may include at least one component, for example, a component mounting portion 620 to which a camera 621 is mounted. Since a plurality of cameras may be disposed to the component mounting portion 620, it will be referred to hereinafter as a camera mounting region.

According to an embodiment of the disclosure, at least one camera mounting region 620 may be disposed to at least one edge among a plurality of edges provided in the housing 610. For instance, the camera mounting region 620 may be disposed to one edge of the housing 610 among four edges provided in the housing 610. For example, the camera mounting region 620 may be disposed to any one edge among an upper edge, lower edge, left edge, and right edge of the housing 610. It is exemplified in FIGS. 14A to 14C that the camera mounting region 620 is disposed to a partial region of the first face 611a of the first housing structure.

According to an embodiment of the disclosure, the camera mounting region 620 may protrude in a direction away from an edge of the second housing structure 610b, for example, in a fifth direction ⑤, and thus may be disposed not to overlap with the second housing structure 610b when folding the flexible display 602 provided in the housing 610.

According to an embodiment of the disclosure, the camera mounting region 620 may include a first mounting face 620a facing the first direction ①and a second mounting face 620b facing the second direction ②. According to an embodiment of the disclosure, at least part of the first mounting face 620a of the camera mounting region 620 may be a flat face on which at least one camera is mounted. According to an embodiment of the disclosure, at least one camera 621 may be arranged in at least a partial region of the second mounting face 620b.

According to an embodiment of the disclosure, when the electronic device 600 is folded in the in-folding manner, the camera mounting region 620 may not overlap with the second housing structure 610b since the first portion 614 is cut. According to an embodiment of the disclosure, when the electronic device 600 is folded, the camera mounting region 620 is open, thereby operating at least one camera 621 arranged on the first mounting face 620a of the camera mounting region 620. According to an embodiment of the disclosure, the at least one camera 621 mounted to the first mounting face 620a of the camera mounting region 620 may operate as a front camera or a rear camera.

According to an embodiment of the disclosure, in the camera mounting region 620, at least one optical sensor 622 may be disposed adjacent to the at least one camera 621. According to an embodiment of the disclosure, in the camera mounting region 620, the at least one optical sensor 622 may be disposed to the first mounting region 620a. For example, the at least one optical sensor 622 may further include at least one of a gesture sensor, a gyro sensor, a barometric pressure sensor, a magnetic sensor, an acceleration sensor, a grip sensor, a color sensor, an InfraRed (IR) sensor, a biological sensor, a temperature sensor, a humidity sensor, and an illuminance sensor. According to an embodiment of the disclosure, the at least one optical sensor 622 may be coplanar with at least one camera 621.

According to an embodiment of the disclosure, the second housing structure 610b may have an open-shaped first portion 614 constructed at part of an edge of the second side member 613b. According to an embodiment of the disclosure, in a state where the electronic device 600 is folded, the camera mounting region 620 may be open by the first portion 614, thereby optically operating at least one camera 621. According to an embodiment of the disclosure, the first portion 614 may be a portion to be cut.

Figure 15A:
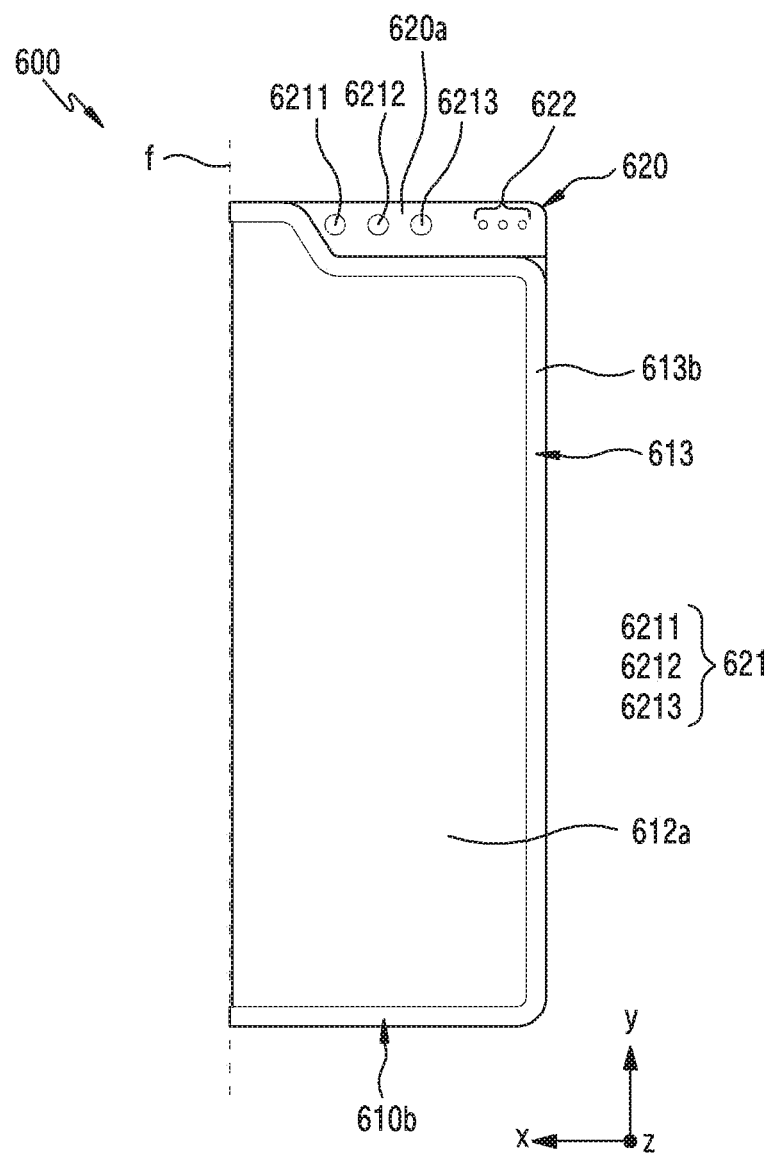
FIG. 15A is a top view illustrating an electronic device of a folded state according to an embodiment of the disclosure.
Figure 15B:
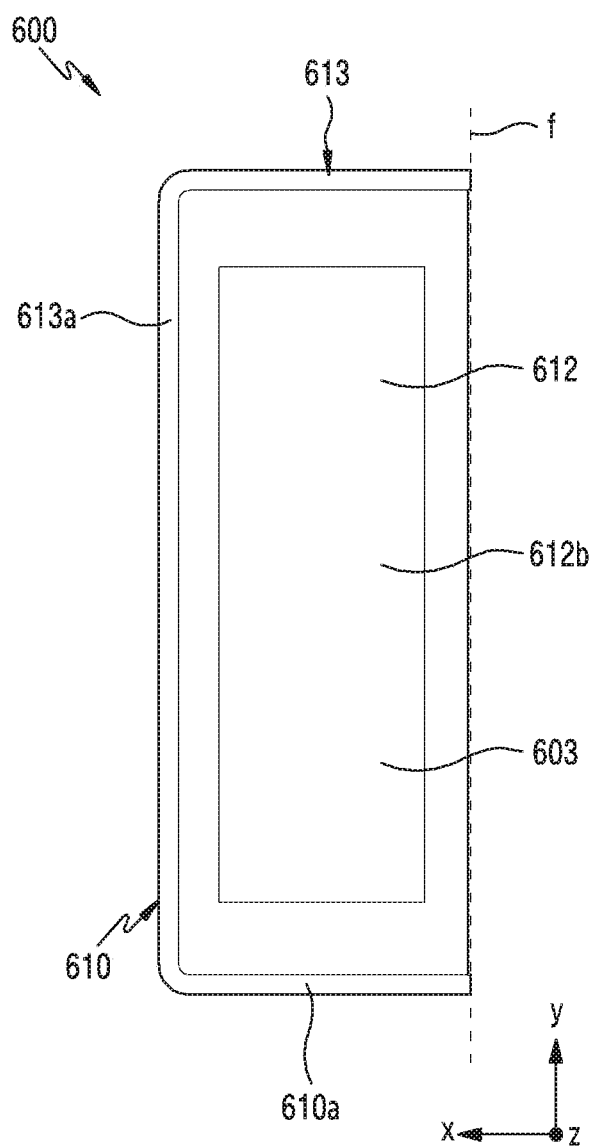
FIG. 15B is a bottom view illustrating an electronic device of a folded state according to an embodiment of the disclosure.

FIG. 15A is a top view illustrating an electronic device of a folded state according to an embodiment of the disclosure. FIG. 15B is a bottom view illustrating an electronic device of a folded state according to an embodiment of the disclosure.

Referring to FIGS. 15A and 15B, in a state where the electronic device 600 according to an embodiment is folded, first and third faces (e.g., first and third faces 611a and 611b of FIG. 14C) of a first plate may face or in contact with each other, and the second and fourth faces 612a and 612b of the second plate 612 may be exposed to the outside. According to an embodiment of the disclosure, the first housing structure 610a may face the second housing structure 610b and may be stacked with each other. According to an embodiment of the disclosure, the first side member 613a may face the second side member 613b, and may be stacked with each other. According to an embodiment of the disclosure, the camera mounting region 620 may be adjacent to a portion of the edge of the second side member 613b.

Figure 16A:
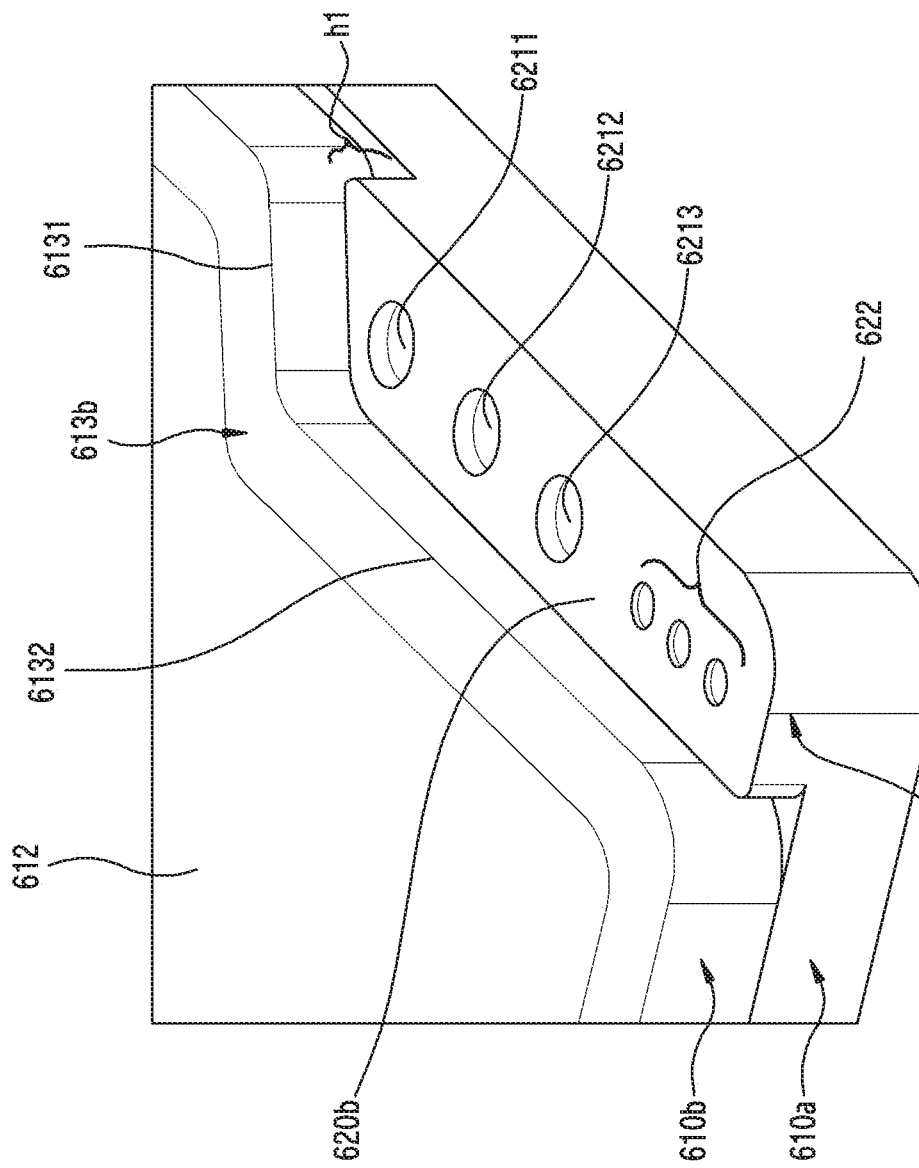
FIG. 16A is a perspective view illustrating at least one camera disposed to a camera mounting region according to an embodiment of the disclosure.
Figure 16B:
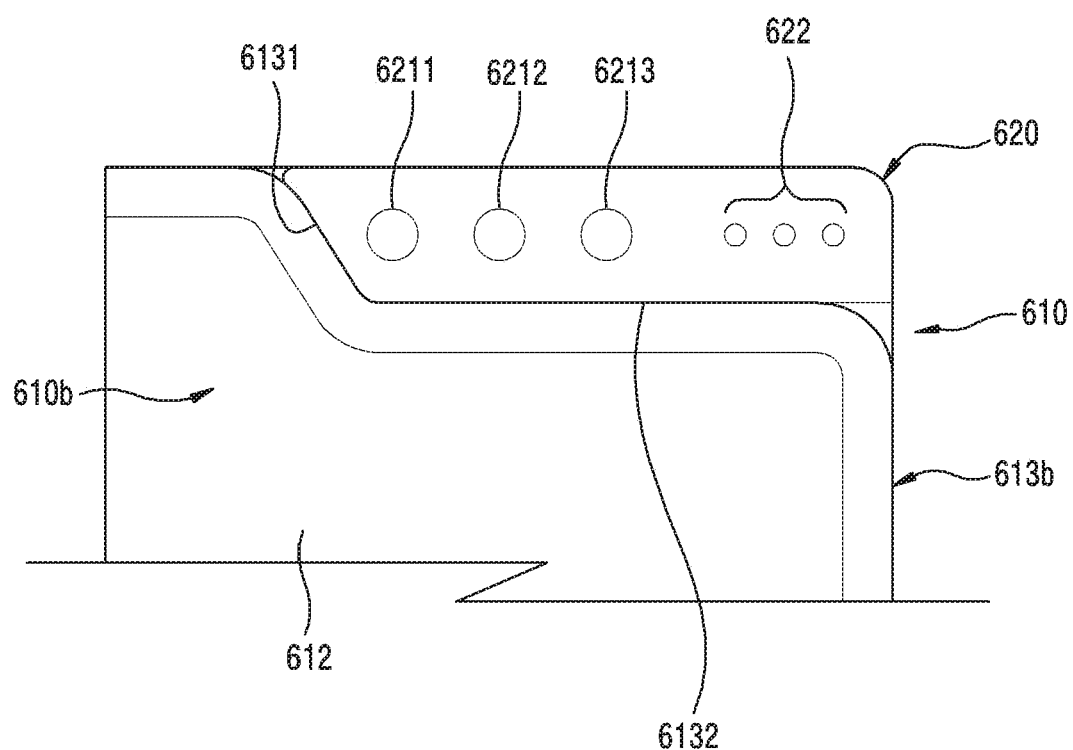
FIG. 16B is a top view of FIG. 16A according to an embodiment of the disclosure.
Figure 16C:
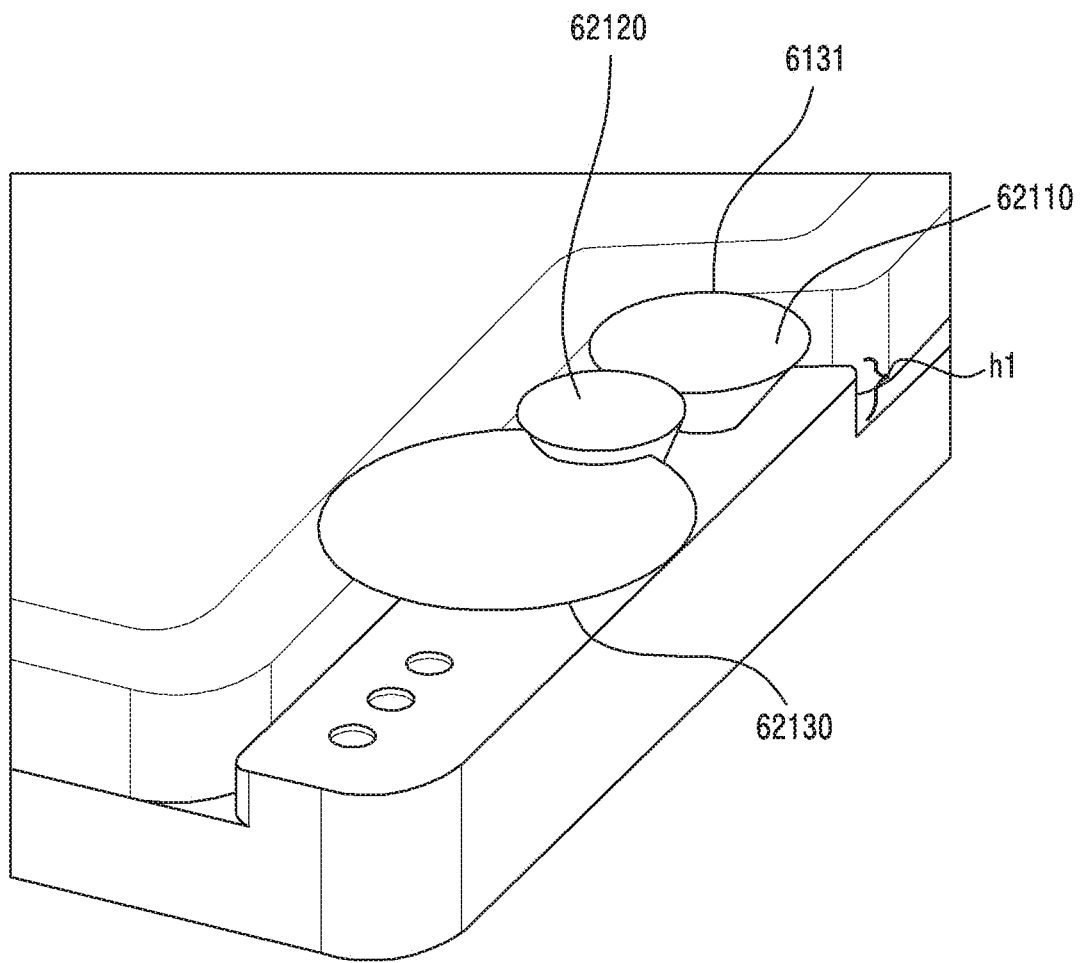
FIG. 16C is a stereoscopic diagram illustrating a viewing angle of at least one camera disposed to a camera mounting region according to an embodiment of the disclosure.

FIG. 16A is a perspective view illustrating at least one camera disposed to a camera mounting region according to an embodiment of the disclosure. FIG. 16B is a top view of FIG. 16A according to an embodiment of the disclosure. FIG. 16C is a stereoscopic diagram illustrating a viewing angle of at least one camera disposed to a camera mounting region according to an embodiment of the disclosure.

Referring to FIGS. 16A to 16C, when the electronic device 600 according to an embodiment is folded in an in-folding manner, at least one or more cameras 6211, 6212, and 6213 and the at least one optical sensor 622 may be open in the first direction ①. According to an embodiment of the disclosure, when the electronic device 600 is in a folded state, the at least one or more cameras 6211, 6212, and 6213 may be disposed adjacent to edges, i.e., a first edge portion 6131 and a second edge portion 6132, of the second side member 613b adjacent to a first portion (e.g., the first portion 614 of FIG. 14A). According to an embodiment of the disclosure, the second edge portion 6132 may be longer than the first edge portion 6131.

According to an embodiment of the disclosure, the camera mounting region 620 may protrude from a first face (e.g., the first face 611a of FIG. 14C) with a specific height h1, and the at least one or more cameras 6211, 6212, and 6213 and the at least one optical sensor 622 may be disposed to the first face with a predetermined height h1. Depending on this camera disposition structure, a viewing angle of the at least one or more cameras 6211, 6212, and 6213 may be enlarged. According to an embodiment of the disclosure, the protrusion height h1 of the camera mounting region 620 may be less than or equal to a thickness of the housing, for example, a thickness of the second housing structure 610b.

According to an embodiment of the disclosure, the protrusion height h1 of the camera mounting region 620 may be less than or equal to the thickness of the second side member 613b. With the increase in the protrusion height h1, the camera mounting region 620 may reduce obscureness of the viewing angle of the cameras 6211, 6212, and 6213 due to the second side member 613b.

According to an embodiment of the disclosure, the at least one or more cameras 6211, 6212, and 6213 may be coplanar with the at least one optical sensor 622. For example, the at least one or more cameras 6211, 6212, and 6213 and the at least one optical sensor 622 may be disposed to one face of the second plate 612 along a direction in which the first mounting face 620a of the camera mounting region 620 extends.

According to an embodiment of the disclosure, regarding the at least one or more cameras 6211, 5212, and 6213, when a camera closest to the first edge portion 6131 is the first camera 6211, a camera farthest from the first edge portion 6131 is the third camera 6213, and a camera disposed between the first and third cameras 6211 and 6213 is the second camera 5212, a viewing angle 62130 of the third camera 6213 may be the greatest, and a viewing angle 62120 of the second camera 6212 may be the smallest. As another example, the viewing angle 62120 of the second camera may be between viewing angles 62110 and 62130 of the first and third cameras. For example, the camera may include the first camera 6211 with a viewing angle of about 78 degrees at a first position, the second camera 6212 with a viewing angle of about 45 degrees at a second position, and the third camera 6213 with a viewing angle of about 120 degrees at a third position. The first camera 6211 may be a wide angle camera, the second camera 6212 may be a telephoto camera, or the third camera 6213 may be a super wide angle camera.

According to an embodiment of the disclosure, the first to third cameras 6211, 6212, and 6213 are not necessarily disposed as described above, and may be disposed variously.

According to an embodiment of the disclosure, embodiments of FIGS. 8A and 8B, embodiments of FIGS. 9A and 9B, embodiments of FIGS. 10A and 10B, embodiments of FIGS. 11A and 11B, or embodiments of FIGS. 12 and 12B may be substantially equally applied to the first edge portion 6131 and second edge portion 6132 of the second side member 613b constructed by being cut to prevent obscureness of a viewing angle of at least one camera disposed to the camera mounting region 620.

According to an embodiment of the disclosure, an electronic device (the electronic device 101 of FIG. 1 or the electronic device 500 of FIG. 5A) may include, as a foldable housing, a first housing structure (e.g., the first housing structure 510a of FIG. 5A) which includes a first face (e.g., the first face 511a of FIG. 5C) facing a first direction (e.g., the first direction of FIG. 5C), a second face (e.g., the second face 512a of FIG. 5C) facing a second direction (e.g., the second direction of FIG. 5C) opposite to the first direction (e.g., the first direction of FIG. 5C), and a first side member (e.g., the first side member 513a of FIG. 5C) surrounding at least part of a space between the first face (e.g., the first face 511a of FIG. 5C) and the second face (e.g., the second face 512a of FIG. 5C) and including at least one second conductive portion, and a second housing structure (e.g., the second housing structure 510b of FIG. 5A) which includes a third face (e.g., the third face 511b of FIG. 5C) facing a third direction (e.g., the third direction of FIG. 5C), a fourth face (e.g., the fourth face 512b of FIG. 5C) facing a fourth direction (e.g., the fourth direction of FIG. 5C) opposite to the third direction (e.g., the third direction of FIG. 5C), and a second side member (e.g., the second side member 513b) surrounding at least part of a space between the third face (e.g., the third face 511b of FIG. 5C) and the fourth face (e.g., the fourth face 512b of FIG. 5C), and which is folded on the first housing structure (e.g., the first housing structure 510a of FIG. 5A), wherein the second face (e.g., the second face 512a of FIG. 5C) faces the fourth face (e.g., the fourth face 512b of FIG. 5C) in a folded state, the third direction (e.g., the third direction of FIG. 5C) is the same as the first direction (e.g., the first direction of FIG. 5C) in an unfolded state, and a portion of an edge of the first housing structure (e.g., the first housing structure 510a of FIG. 5A) is cut so that a camera mounting region (e.g., the camera mounting region 520 of FIG. 5B) of the second face (e.g., the second face 512*a* of FIG. 5C) is visible when viewed from above the third face (e.g., the third face 511*b* of FIG. 5C) in the folded state, a flexible display (e.g., the flexible display 502 of FIG. 5A) extending from the first face (e.g., the first face 511*a* of FIG. 5C) to the third face (e.g., the third face 511*b* of FIG. 5C), and at least one camera (e.g., the camera 521 of FIG. 5B) disposed to the camera mounting region (e.g., the camera mounting region 520 of FIG. 5B). In the folded date, at least one edge portion of the second side member adjacent to the camera mounting region (e.g., the camera mounting region 520 of FIG. 5B) may include at least one inclined face constructed by cutting a partial region overlapping with a viewing angle of the camera (e.g., the camera 521 of FIG. 5B).

According to an embodiment of the disclosure, the at least one camera (e.g., the camera 521 of FIG. 5B) may be disposed to face the second direction.

According to an embodiment of the disclosure, the camera mounting region (e.g., the camera mounting region 520 of FIG. 5B) may protrude from the first housing structure (e.g., the first housing structure 510*a* of FIG. 5A) in a direction perpendicular to the first and second directions or the third and fourth directions.

According to an embodiment of the disclosure, the at least one edge portion may include a first edge portion (e.g., the first edge portion 5131 of FIG. 8A) and a second edge portion (e.g., the second edge portion 5132 of FIG. 8A) extending from the first edge portion (e.g., the first edge portion 5131 of FIG. 8A). When the flexible display (e.g., the flexible display 502 of FIG. 5A) is folded, the at least one camera (e.g., the camera 521 of FIG. 5B) may include a first camera (e.g., the first camera 5211 of FIG. 7A) disposed adjacent to the first and second edge portions, and a second camera (e.g., the second camera 5212 of FIG. 7A) disposed adjacent to the second edge portion (e.g., the second edge portion 5132 of FIG. 8A) and disposed adjacent to the first camera (e.g., the first camera 5211 of FIG. 7A).

According to an embodiment of the disclosure, a viewing angle of the second camera (e.g., the second camera 5212 of FIG. 7A) may be greater than a viewing angle of the first camera (e.g., the first camera 5211 of FIG. 7A).

According to an embodiment of the disclosure, a viewing angle of the first camera (e.g., the first camera 5211 of FIG. 7A) may range from 45 degrees to 78 degrees, and a viewing angle of the second camera (e.g., the second camera 5212 of FIG. 7A) may range from 80 degrees to 120 degrees.

According to an embodiment of the disclosure, the at least one inclined face (e.g., the inclined face 531, 532, or 533 of FIG. 8A) may include a first inclined face constructed at the first edge portion (e.g., the first edge portion 5131 of FIG. 8A) in a direction inclined with a first angle, and a second inclined face constructed at the second edge portion (e.g., the second edge portion 5132 of FIG. 8A) in a direction inclined with a second angle.

According to an embodiment of the disclosure, the first and second inclined faces may be constructed not to overlap with a viewing angle of a camera having a greatest viewing angle among the at least one camera (e.g., the camera 521 of FIG. 5B).

According to an embodiment of the disclosure, the camera mounting region (e.g., the camera mounting region 520 of FIG. 5B) may have a shape protruding from the second face in the second direction.

According to an embodiment of the disclosure, a protrusion height (e.g., the protrusion height h of FIG. 7A) of the camera mounting region may be less than or equal to a thickness of the second housing structure.

According to an embodiment of the disclosure, at least one optical sensor (e.g., the at least one optical sensor 522 of FIG. 5A) may be disposed adjacent to the at least one camera (e.g., the camera 521 of FIG. 5B) in the camera mounting region (e.g., the camera mounting region 520 of FIG. 5B).

According to an embodiment of the disclosure, the at least one camera (e.g., the camera 521 of FIG. 5B) and the at least one optical sensor (e.g., the at least one optical sensor 522 of FIG. 5A) may be arranged along a direction in which the camera mounting region (e.g., the camera mounting region 520 of FIG. 5B) extends.

According to an embodiment of the disclosure, an electronic device (e.g., the electronic device 101 of FIG. 1 or the electronic device 500 of FIG. 5A) may include a foldable housing (e.g., the foldable housing 510 of FIG. 5A) including a first housing structure (e.g., the first housing structure 510*a* of FIG. 5A) including a first side member (e.g., the first side member 513*a* of FIG. 5C) and a second housing structure (e.g., the second housing structure 510*b* of FIG. 5A) including a second side member (e.g., the second side member 513*b* of FIG. 5C) and folded on the first housing structure (e.g., the second housing structure 510*b* of FIG. 5A), a flexible display (e.g., the flexible display 502 of FIG. 5A) disposed to one face of the foldable housing (e.g., the foldable housing 510 of FIG. 5A) and to be folded, a camera mounting region (e.g., the camera mounting region 520 of FIG. 5B) constructed at part of the first housing structure (e.g., the first housing structure 510*a* of FIG. 5A) and visible in a folded state, and at least one camera (e.g., the camera 521 of FIG. 5B) disposed to the camera mounting region (e.g., the camera mounting region 520 of FIG. 5B). In the folded date, at least one edge portion of the second side member adjacent to the camera mounting region (e.g., the camera mounting region 520 of FIG. 5B) may include at least one inclined face constructed by cutting a partial region overlapping with a viewing angle of the camera.

According to an embodiment of the disclosure, the camera mounting region (e.g., the camera mounting region 520 of FIG. 5B) may be disposed to the first housing structure (e.g., the first housing structure 510*a* of FIG. 5A) in a protrusion manner.

According to an embodiment of the disclosure, when the first housing structure (e.g., the first housing structure 510*a* of FIG. 5A) and the second housing structure (e.g., the second housing structure 510*b* of FIG. 5A) are folded, the second side member may include a first edge portion (e.g., the first edge portion 5131 of FIG. 8A) adjacent to the camera mounting region (e.g., the camera mounting region 520 of FIG. 5B), and a second edge portion (e.g., the second edge portion 5132 of FIG. 8A) adjacent to the camera mounting region (e.g., the camera mounting region 520 of FIG. 5B) and extending from the first edge portion (e.g., the first edge portion 5131 of FIG. 8A). A length of the second edge portion (e.g., the second edge portion 5132 of FIG. 8A) may be longer than a length of the first edge portion (e.g., the first edge portion 5131 of FIG. 8A)

According to an embodiment of the disclosure, at least one inclined face (e.g., the inclined face 531, 532, or 533 of FIG. 8A) may be constructed at the first edge portion (e.g., the first edge portion 5131 of FIG. 8A) and the second edge portion (e.g., the second edge portion 5132 of FIG. 8A) not to obscure a viewing angle of a camera having a greatest viewing angle among at least one camera (e.g., the camera

521 of FIG. 5B) disposed to the camera mounting region (e.g., the camera mounting region 520 of FIG. 5B).

According to an embodiment of the disclosure, when the flexible display (e.g., the flexible display 502 of FIG. 5A) is folded, the at least one camera (e.g., the camera 521 of FIG. 5B) may include a first camera (e.g., the first camera 5211 of FIG. 7A) disposed adjacent to the first and second edge portions, and a second camera (e.g., the second camera 5212 of FIG. 7A) disposed adjacent to the second edge portion (e.g., the second edge portion 5132 of FIG. 8A) and disposed adjacent to the first camera (e.g., the first camera 5211 of FIG. 7A).

According to an embodiment of the disclosure, a viewing angle of the second camera (e.g., the second camera 5212 of FIG. 7A) may be greater than a viewing angle of the first camera (e.g., the first camera 5211 of FIG. 7A).

According to an embodiment of the disclosure, an electronic device (e.g., the electronic device 101 of FIG. 1 or the electronic device 500 of FIG. 5A) may include a foldable housing (e.g., the foldable housing 510 of FIG. 5A), a flexible display (e.g., the flexible display 502 of FIG. 5A) disposed to one face of the foldable housing (e.g., the foldable housing 510 of FIG. 5A) and to be folded, a camera mounting region (e.g., the camera mounting region 520 of FIG. 5B) constructed at part of the foldable housing (e.g., the foldable housing 510 of FIG. 5A) and visible in a folded state, and at least one camera (e.g., the camera 521 of FIG. 5B) disposed to the camera mounting region (e.g., the camera mounting region 520 of FIG. 5B). In the folded date, at least one edge portion of the foldable housing (e.g., the foldable housing 510 of FIG. 5A) adjacent to the camera mounting region (e.g., the camera mounting region 520 of FIG. 5B) may include at least one inclined face constructed by cutting a partial region overlapping with a viewing angle of the camera.

According to an embodiment of the disclosure, the camera mounting region (e.g., the camera mounting region 520 of FIG. 5B) may be constructed at the other face opposite to the one face of the foldable housing (e.g., the foldable housing 510 of FIG. 5A) in a protrusion manner.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
    as a foldable housing,
    a first housing structure which comprises:
        a first face facing a first direction,
        a second face facing a second direction opposite to the first direction, and
        a first metallic side member surrounding at least part of a space between the first face and the second face;
    a second housing structure which comprises:
        a third face facing a third direction,
        a fourth face facing a fourth direction opposite to the third direction, and
        a second metallic side member surrounding at least part of a space between the third face and the fourth face, and which is folded on the first housing structure,
        wherein the second face faces the fourth face in a folded state, the third direction is the same as the first direction in an unfolded state, and a portion of an edge of the first housing structure is cut so that a camera mounting region of the fourth face is visible when viewed from above the first face in the folded state, the cut of the first housing structure shortening a length of a portion of the first housing structure so that the camera mounting region of the fourth face of the second housing structure is visible in the folded state;
    a flexible display extending from the first face to the third face; and
    at least one camera disposed in the camera mounting region, and
    wherein, in the folded state, at least one edge portion of the first metallic side member adjacent to the camera mounting region comprises at least one inclined face constructed by cutting a partial region overlapping with a viewing angle of the at least one camera, the at least one edge portion on a perimeter of the first housing structure.

2. The electronic device of claim 1, wherein the at least one camera is disposed to face the second direction.

3. The electronic device of claim 1, wherein the camera mounting region protrudes from the first housing structure in a direction perpendicular to the first and second directions or the third and fourth directions.

4. The electronic device of claim 1,
    wherein the at least one edge portion comprises:
        a first edge portion, and
        a second edge portion extending from the first edge portion, and
    wherein, when the flexible display is folded, the at least one camera comprises:
        a first camera disposed adjacent to the first and second edge portions, and
        a second camera disposed adjacent to the second edge portion and disposed adjacent to the first camera.

5. The electronic device of claim 4, wherein a viewing angle of the second camera is greater than a viewing angle of the first camera.

6. The electronic device of claim 4,
    wherein a viewing angle of the first camera ranges from 45 degrees to 78 degrees, and
    wherein a viewing angle of the second camera ranges from 80 degrees to 120 degrees.

7. The electronic device of claim 4, wherein the at least one inclined face comprises:
    a first inclined face constructed at the first edge portion in a direction inclined with a first angle; and
    a second inclined face constructed at the second edge portion in a direction inclined with a second angle.

8. The electronic device of claim 7, wherein the first and second inclined faces are constructed not to overlap with a viewing angle of a camera having a greatest viewing angle among the at least one camera.

9. The electronic device of claim 1, wherein the camera mounting region includes a shape protruding from the second face in the second direction.

10. The electronic device of claim 9, wherein a protrusion height of the camera mounting region is less than or equal to a thickness of the second housing structure.

11. The electronic device of claim 1, wherein at least one optical sensor is disposed adjacent to the at least one camera in the camera mounting region.

12. The electronic device of claim 11, wherein the at least one camera and the at least one optical sensor are arranged along a direction in which the camera mounting region extends.

13. An electronic device comprising:
a foldable housing comprising a first housing structure comprising a first metallic side member;
a second housing structure comprising a second metallic side member and folded on the first housing structure;
a flexible display disposed to one face of the foldable housing and to be folded;
a camera mounting region constructed at part of the first housing structure and visible in a folded state, a portion of the second housing structure overlapping the camera mounting region being removed to provide visibility in the folded state, a length of a portion of the second housing structure being less than a length of the first housing structure, the camera mounting region protruding from the first housing structure towards an area of the removed portion of the second housing structure in the folded state; and
at least one camera disposed in the camera mounting region,
wherein, in the folded state, at least one edge portion of the second metallic side member adjacent to the camera mounting region comprises at least one inclined face constructed by cutting a partial region overlapping with a viewing angle of the at least one camera, the at least one edge portion on a perimeter of the second housing structure.

14. The electronic device of claim 13, wherein the camera mounting region is disposed in the first housing structure in a protrusion manner.

15. The electronic device of claim 13,
wherein, when the first housing structure and the second housing structure are folded, the second metallic side member comprises:
a first edge portion adjacent to the camera mounting region, and
a second edge portion adjacent to the camera mounting region and extending from the first edge portion, and
wherein a length of the second edge portion is longer than a length of the first edge portion.

16. The electronic device of claim 15, wherein at least one inclined face is constructed at:
the first edge portion; and
the second edge portion not to obscure a viewing angle of a camera having a greatest viewing angle among at least one camera disposed in the camera mounting region.

17. The electronic device of claim 16, wherein, when the flexible display is folded, the at least one camera comprises:
a first camera disposed adjacent to the first and second edge portions; and
a second camera disposed adjacent to the second edge portion and disposed adjacent to the first camera.

18. The electronic device of claim 17, wherein a viewing angle of the second camera is greater than a viewing angle of the first camera.

19. The electronic device of claim 13, wherein a portion of an outer perimeter of the camera mounting region forms a portion of an outer perimeter of the electronic device.

* * * * *